US012346152B2

(12) United States Patent
Nam et al.

(10) Patent No.: US 12,346,152 B2
(45) Date of Patent: Jul. 1, 2025

(54) ELECTRONIC DEVICE

(71) Applicant: Samsung Display Co., Ltd., Yongin-si (KR)

(72) Inventors: Hyeyoung Nam, Cheonan-si (KR); Boyun Kim, Cheonan-si (KR); Namhee Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/668,524

(22) Filed: May 20, 2024

(65) Prior Publication Data
US 2024/0302856 A1 Sep. 12, 2024

Related U.S. Application Data

(63) Continuation of application No. 18/093,279, filed on Jan. 4, 2023, now Pat. No. 12,045,085, which is a
(Continued)

(30) Foreign Application Priority Data

Feb. 19, 2020 (KR) ........................ 10-2020-0020250

(51) Int. Cl.
G06F 1/16 (2006.01)
G02B 1/14 (2015.01)
G09F 9/30 (2006.01)

(52) U.S. Cl.
CPC ............. *G06F 1/1605* (2013.01); *G02B 1/14* (2015.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS 8,159,130 B2    4/2012   Shim et al.
9,250,656 B2 *  2/2016   Hirai ..................... G06F 1/1637
(Continued)

FOREIGN PATENT DOCUMENTS

CN    109801561 A    5/2019
CN    110610965 A    12/2019
(Continued)

OTHER PUBLICATIONS

Examination Report dated May 17, 2021, issued to PCT/KR2021/001877.
(Continued)

*Primary Examiner* — Lisa Lea-Edmonds
(74) *Attorney, Agent, or Firm* — CANTOR COLBURN LLP

(57) ABSTRACT

An electronic device includes: a display panel having an active region and a peripheral region adjacent to the active region; an electronic module disposed below the display panel; a first light-blocking element disposed on the display panel and overlapping the peripheral region; and a second light-blocking element disposed on the electronic module with the display panel interposed therebetween. A hole is at least partially surrounded by the active region is defined in a portion of the display panel. The second light blocking element is disposed in an area adjacent to the hole, when viewed in a plan view. The first light-blocking element has a first thickness and the second light-blocking element has a second thickness less than the first thickness.

17 Claims, 15 Drawing Sheets

Related U.S. Application Data continuation of application No. 17/142,048, filed on Jan. 5, 2021, now Pat. No. 11,556,146.

(56) References Cited

U.S. PATENT DOCUMENTS

| | | | |
|---|---|---|---|
| 9,632,487 B2 | 4/2017 | Kim et al. | |
| 9,865,844 B1 | 1/2018 | Park et al. | |
| 10,466,822 B2 | 11/2019 | Kim et al. | |
| 10,790,340 B2 | 9/2020 | Lee et al. | |
| 10,847,586 B2 | 11/2020 | Lee | |
| 10,964,908 B2 * | 3/2021 | Nam | G06F 3/0412 |
| 11,081,536 B1 | 8/2021 | Yang et al. | |
| 11,086,438 B2 | 8/2021 | Park et al. | |
| 11,158,684 B2 | 10/2021 | Lee et al. | |
| 11,172,577 B2 | 11/2021 | Wang et al. | |
| 11,216,636 B2 | 1/2022 | Song et al. | |
| 11,227,875 B2 | 1/2022 | Kim et al. | |
| 11,235,554 B2 | 2/2022 | Park et al. | |
| 11,251,247 B2 | 2/2022 | Kim et al. | |
| 11,262,862 B2 | 3/2022 | Jung et al. | |
| 11,275,473 B2 | 3/2022 | Bok et al. | |
| 11,302,747 B2 | 4/2022 | Heo et al. | |
| 11,404,472 B2 * | 8/2022 | Lee | H10H 29/142 |
| 11,469,393 B2 | 10/2022 | Eo et al. | |
| 11,544,957 B2 * | 1/2023 | Ryu | G06V 40/1318 |
| 11,556,146 B2 * | 1/2023 | Nam | G02B 1/14 |
| 11,907,031 B2 * | 2/2024 | Kim | G06F 1/1686 |
| 11,910,581 B2 * | 2/2024 | Kim | H05K 7/20963 |
| 12,045,085 B2 * | 7/2024 | Nam | G09F 9/301 |
| 12,156,441 B2 * | 11/2024 | Bang | H10K 59/131 |
| 12,185,486 B2 * | 12/2024 | Yoon | H05K 5/0017 |
| 2017/0059771 A1 | 3/2017 | Yuki et al. | |
| 2017/0287992 A1 | 10/2017 | Kwak et al. | |
| 2017/0373281 A1 * | 12/2017 | Park | H10K 59/8791 |
| 2018/0183015 A1 | 6/2018 | Yun et al. | |
| 2019/0073505 A1 | 3/2019 | Kwon et al. | |
| 2020/0045826 A1 | 2/2020 | Wang et al. | |
| 2020/0325952 A1 | 10/2020 | Ryu et al. | |
| 2021/0013267 A1 | 1/2021 | Lee et al. | |
| 2021/0096643 A1 | 4/2021 | Park et al. | |
| 2021/0104578 A1 | 4/2021 | Jo et al. | |
| 2021/0119170 A1 | 4/2021 | Eo et al. | |
| 2021/0125557 A1 | 4/2021 | Na | |
| 2021/0167144 A1 | 6/2021 | Lim et al. | |
| 2021/0255664 A1 * | 8/2021 | Nam | G09F 9/301 |
| 2021/0256882 A1 * | 8/2021 | Kim | H04M 1/0264 |
| 2021/0349568 A1 | 11/2021 | Park et al. | |
| 2022/0059796 A1 | 2/2022 | Kim et al. | |
| 2022/0085334 A1 | 3/2022 | Oh et al. | |
| 2022/0377922 A1 * | 11/2022 | Yoon | H10K 71/70 |
| 2023/0152845 A1 * | 5/2023 | Nam | G06F 1/1605 361/679.02 |
| 2023/0309363 A1 * | 9/2023 | Park | H10K 59/873 |
| 2023/0371321 A1 | 11/2023 | Lee et al. | |
| 2024/0302856 A1 * | 9/2024 | Nam | G06F 1/1616 |

FOREIGN PATENT DOCUMENTS

| | | |
|---|---|---|
| CN | 110707123 A | 1/2020 |
| EP | 3330841 A1 | 6/2018 |
| KR | 10-2014-0115156 | 9/2014 |
| KR | 10-1436994 | 9/2014 |
| KR | 1020150136662 A | 12/2015 |
| KR | 1020160033893 A | 3/2016 |
| KR | 10-2017-0015632 | 2/2017 |
| KR | 1020170111827 A | 10/2017 |
| KR | 1020180002114 A | 1/2018 |
| KR | 10-2018-0063633 | 6/2018 |
| KR | 10-2018-0076429 | 7/2018 |
| KR | 10-2018-0138311 | 12/2018 |
| KR | 10-2019-0053732 | 5/2019 |
| KR | 10-2019-0089578 | 7/2019 |
| KR | 10-2020-0014459 | 2/2020 |

OTHER PUBLICATIONS

Notice of Allowance dated May 11, 2022, issued to U.S. Appl. No. 17/142,048.

Notice of Allowance dated Aug. 23, 2022, issued to U.S. Appl. No. 17/142,048.

* cited by examiner

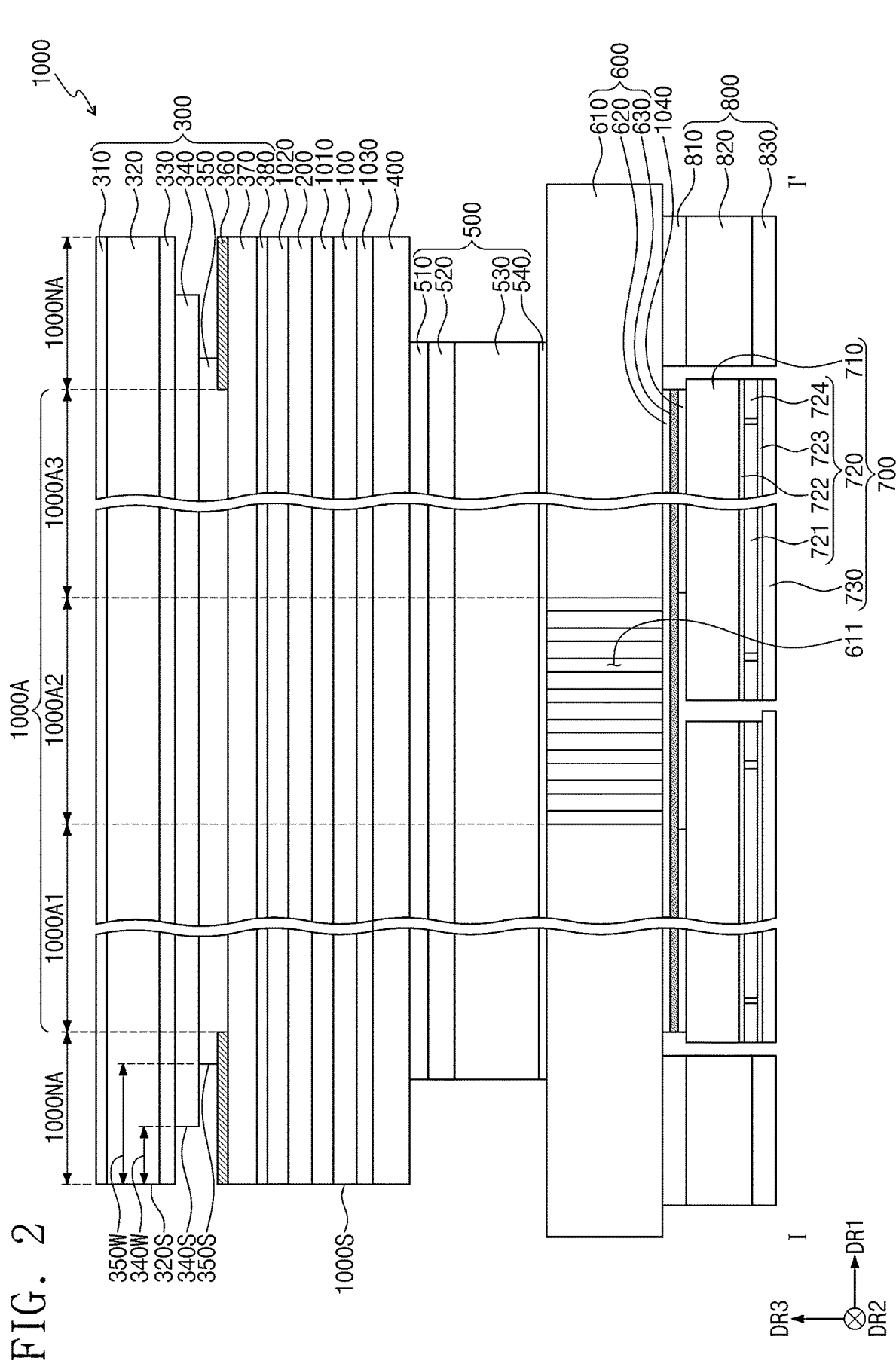

FIG. 4B
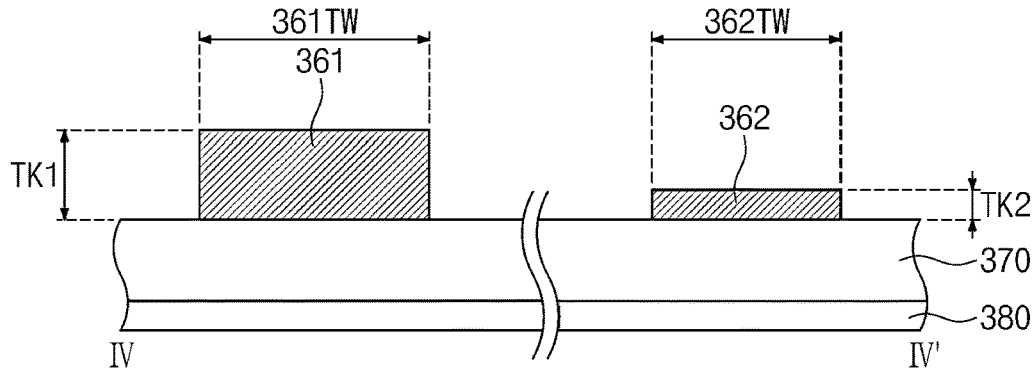
FIG. 4C
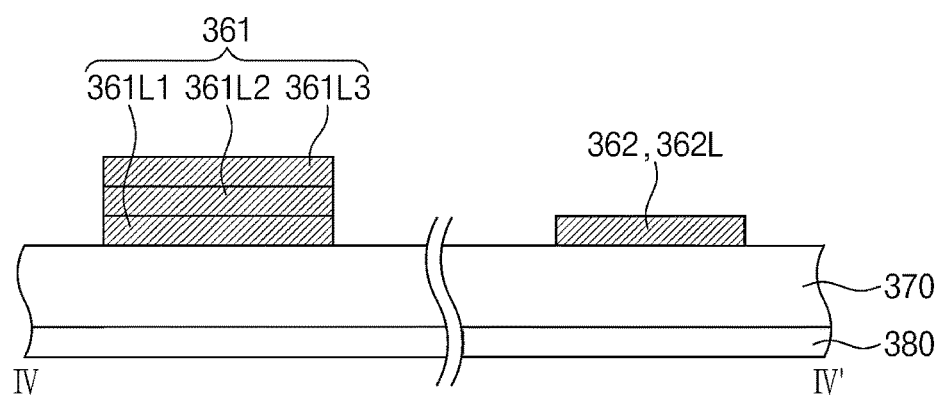
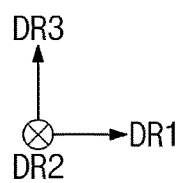

FIG. 5
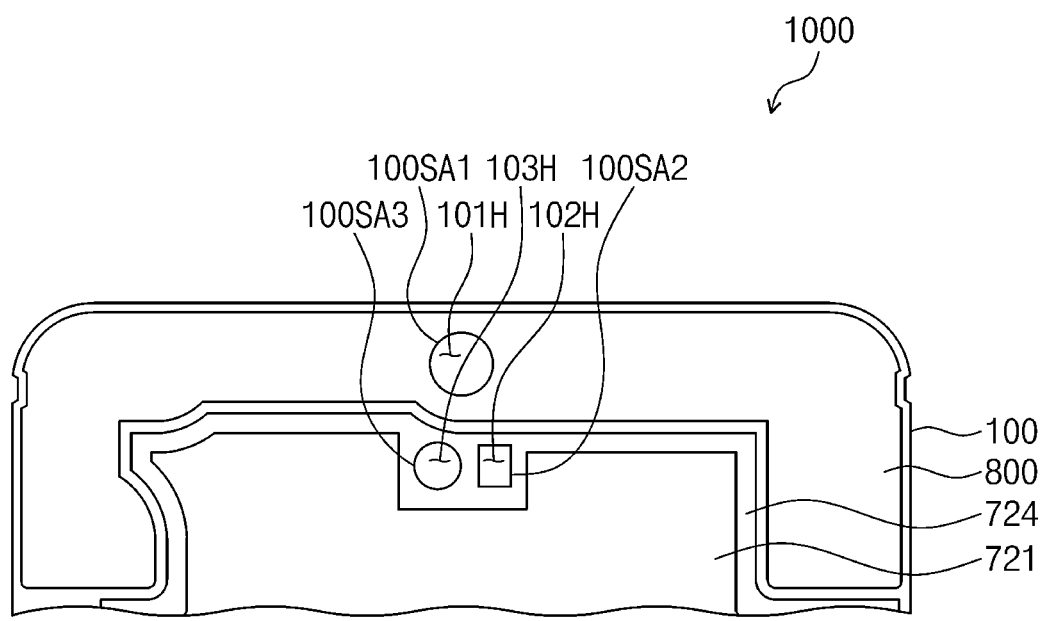
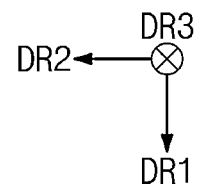

ELECTRONIC DEVICE

CROSS-REFERENCE TO RELATED APPLICATIONS

This application is a continuation of U.S. patent application Ser. No. 18/093,279, filed on Jan. 4, 2023, which is a continuation of U.S. patent application Ser. No. 17/142,048, filed on Jan. 5, 2021, which claims priority from and the benefit of Korean Patent Application No. 10-2020-0020250, filed on Feb. 19, 2020, which is hereby incorporated by reference for all purposes as if fully set forth herein.

BACKGROUND

Field

Exemplary implementations of the invention relate generally to an electronic device, and more specifically, to a foldable electronic device.

Discussion of the Background

An electronic device includes an active region that is activated by an electrical signal. The active region is used to sense an input applied from the outside and to display various images to provide information to a user. As, recently, various shapes of electronic devices are developed, it is necessary to diversify the shape of the active region.

The above information disclosed in this Background section is only for understanding of the background of the inventive concepts, and, therefore, it may contain information that does not constitute prior art.

SUMMARY

Electronic devices constructed according to the principles and exemplary implementations of the invention have an active region with an increased area. For example, one or more of electronic modules of the electronic device may overlap and/or be surrounded by the active region rather than a peripheral region to decrease the size of the peripheral region. Accordingly, the active region may have a relatively large area.

Electronic devices constructed according to the principles and exemplary implementations of the invention have improved reliability. For example, the electronic device may include first and second patterns to block light wherein the first pattern covers the peripheral region, and the second pattern surrounds an electronic module of the electronic device that is received in the active region. The electronic module may sense various types of signals such as visible light passing through the layers to generate images and/or electrical signals. The first pattern may be thicker than the second pattern to permit layers covering and/or disposed on the second pattern and the electronic module to be planarized, thereby reducing curvature and/or uneven portions in the covering layers. Therefore, it may be possible to reduce or prevent deterioration in the quality of the images and/or the electrical signals generated by the electronic module. In addition, the second pattern of the electronic device may be formed and/or printed on a layer having an uneven and/or a rough surface. Accordingly, the probability that the second pattern becomes detached from the layer may be reduced, thereby improving the reliability of the electronic device.

Additional features of the inventive concepts will be set forth in the description which follows, and in part will be apparent from the description, or may be learned by practice of the inventive concepts.

According to one aspect of the invention, an electronic device includes: a display panel having an active region and a peripheral region adjacent to the active region; an electronic module disposed below the display panel; a first light-blocking element disposed on the display panel and overlapping the peripheral region; and a second light-blocking element disposed on the electronic module with the display panel interposed therebetween. A hole may be at least partially surrounded by the active region is defined in a portion of the display panel. The second light blocking element is disposed in an area adjacent to the hole, when viewed in a plan view. The first light-blocking element has a first thickness and the second light-blocking element has a second thickness less than the first thickness.

The first light-blocking element may include a first light-blocking pattern having the first thickness, the second light-blocking element may include a second light-blocking pattern having the second thickness, and the first thickness may be greater than or equal to three times the second thickness.

The second thickness may range from about 0.5 μm to about 1.5 μm.

The electronic device may further include: a window disposed on the display panel; and an adhesive layer spaced apart from the display panel with the window interposed therebetween. The second light-blocking element may be disposed between the window and the adhesive layer.

The electronic device may further include a hard coating layer disposed below the window. The second light-blocking element and the hard coating layer may be spaced apart from each other with the window interposed therebetween.

The electronic device may further include an impact absorbing layer disposed on the display panel.

The electronic device may further include a hard coating layer disposed between the impact absorbing layer and the display panel and contacting with the impact absorbing layer. The second light-blocking element may be spaced apart from the impact absorbing layer with the hard coating layer interposed therebetween.

The second light-blocking element may be directly printed on a surface of the impact absorbing layer.

The electronic device may further include a hard coating layer disposed between the impact absorbing layer and the display panel and contacting with the impact absorbing layer. The second light-blocking element may be spaced apart from the hard coating layer with the impact absorbing layer interposed therebetween.

A hole may be defined in a portion of the display panel, and a portion of the hard coating layer may be exposed by the hole.

A first portion of the second light-blocking element may overlap the hole, and a second portion of the second light-blocking element may not overlap the hole.

The electronic device may further include a window disposed on the impact absorbing layer. The second light-blocking element may be disposed between the window and the impact absorbing layer or on the window.

The electronic device may further include an anti-reflection member disposed on the display panel. The second light-blocking element may be disposed on the anti-reflection member, and the second light-blocking element may be spaced apart from the display panel with the anti-reflection member interposed therebetween.

The first light-blocking element may include first stacked layers, the second light-blocking element may include one or more second stacked layers, and the number of the first stacked layers may be greater than the number of the one or more second stacked layers.

The second light-blocking element may be at least partially surrounded by the active region, when viewed in a plan view.

The first light-blocking element may have a width greater than a width of the second light-blocking element.

The display panel may include a foldable area extending along a folding axis.

According to another aspect of the invention, an electronic device includes: a window; an impact absorbing layer disposed below the window; a hard coating layer disposed below the impact absorbing layer; a display panel disposed below the hard coating layer, the display panel including a hole defined therein; and a light-blocking pattern disposed on the impact absorbing layer near the hole.

The impact absorbing layer and the hard coating layer may be in direct contact with each other, the impact absorbing layer and the light-blocking pattern may be in direct contact with each other, and the impact absorbing layer may be disposed between the hard coating layer and the light-blocking pattern.

The electronic device may further include a peripheral light-blocking pattern disposed on a same layer as the light-blocking pattern. The peripheral light-blocking pattern may have a thickness greater than a thickness of the light-blocking pattern, and the peripheral light-blocking pattern may have a width greater than a width of the light-blocking pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 2 is a cross-sectional view taken along line I-I' of FIG. 1A to illustrate an exemplary embodiment of the electronic device according to an embodiment.

FIG. 4B is a cross-sectional view taken along line IV-IV' of FIG. 4A to illustrate an exemplary embodiment of the electronic device.

FIG. 4C is a cross-sectional view taken along line IV-IV' of FIG. 4A to illustrate another exemplary embodiment of the electronic device.

FIG. 5 is a rear view of an exemplary embodiment of some elements of the electronic device of FIG. 1A.

DETAILED DESCRIPTION

Figure 1A:
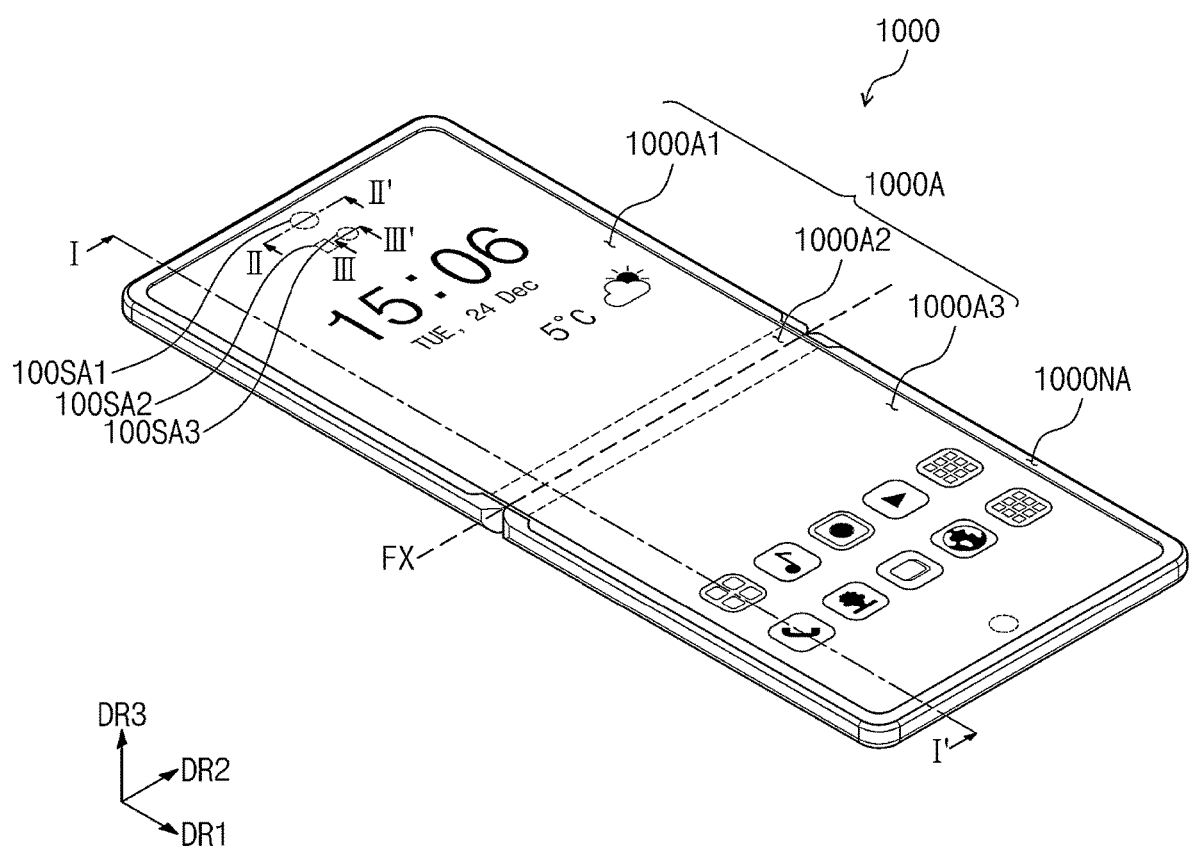
FIG. 1A is a perspective view of an exemplary embodiment of an electronic device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
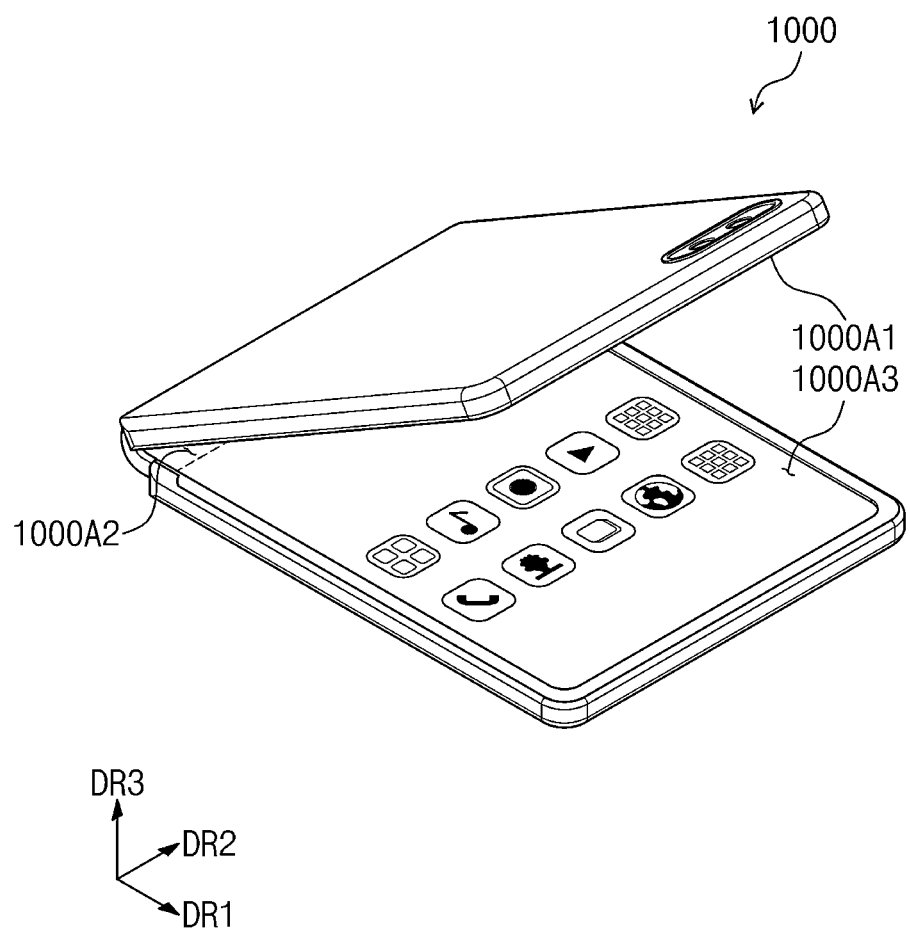
FIG. 1B is a perspective view of the electronic device of FIG. 1A as it is being folded along a folding axis.

FIG. 1A is a perspective view of an exemplary embodiment of an electronic device constructed according to the principles of the invention. FIG. 1B is a perspective view of the electronic device of FIG. 1A as it is being folded along a folding axis. FIG. 1A illustrates an unfolded position of an electronic device 1000, and FIG. 1B illustrates a folded position of the electronic device 1000.

Referring to FIGS. 1A and 1B, the electronic device 1000 may be selectively activated by an electrical signal applied thereto. For example, the electronic device 1000 may be a computer device such as a cellular phone, a tablet, a car navigation system, a gaming machine, or a wearable device, but exemplary embodiments are not limited to these examples. FIG. 1A illustrates an example in which the electronic device 1000 is the cellular phone.

The electronic device 1000 may include an active region 1000A, which is used to display an image. When the electronic device 1000 is the unfolded position, the active region 1000A may include a plane defined by a first direction DR1 and a second direction DR2. The thickness direction of the electronic device 1000 may be parallel to a third direction DR3 intersecting the first direction DR1 and the second direction DR2. Accordingly, a front or top surface and a rear or bottom surface of each member constituting the electronic device 1000 may be defined based on the third direction DR3.

The active region 1000A may include a first region 1000A1, a second region 1000A2, and a third region 1000A3. The second region 1000A2 may be bent or folded along a folding axis FX extending in the second direction DR2. Accordingly, the first region 1000A1 and the third region 1000A3 may be referred to as non-foldable regions, and the second region 1000A2 may be referred to as a foldable region.

When the electronic device 1000 is folded, the first region 1000A1 and the third region 1000A3 may face each other. Accordingly, in a fully-folded position, the active region 1000A may not be exposed to the outside, and this position may be referred to as an in-folding position. However, exemplary embodiments are not limited to this folding operation of the electronic device 1000.

As an example, when the electronic device 1000 is folded, the first region 1000A1 and the third region 1000A3 may be opposite to each other. For example, in the folded position, the active region 1000A may be exposed to the outside, and this position may be referred to as an out-folding position.

In an exemplary embodiment, only one of the in-folding and out-folding operations may be allowed for the electronic device 1000. In another exemplary embodiment, both of the in-folding and out-folding operations may be allowed for the electronic device 1000. In this case, a specific region (e.g., the second region 1000A2) of the electronic device 1000 may be folded in an in-folding and out-folding manner. In other exemplary embodiment, a region of the electronic device 1000 may be folded in the in-folding manner, and another region of the electronic device 1000 may be folded in the out-folding manner.

FIGS. 1A and 1B illustrate an example, in which one foldable region and two non-foldable regions are provided, but the numbers of the foldable and non-foldable regions are not limited to this example. For instance, the electronic device 1000 may include two or more non-foldable regions and at least one foldable region, which is disposed between adjacent ones of the non-foldable regions.

FIGS. 1A and 1B illustrate an example, in which the folding axis FX is generally parallel to a short axis of the electronic device 1000, but exemplary embodiments are not limited to this example. For example, the folding axis FX may be generally parallel to a long axis of the electronic device 1000 (e.g., the first direction DR1). In this case, the first region 1000A1, the second region 1000A2, and the third region 1000A3 may be sequentially arranged in the second direction DR2.

A plurality of sensing regions 100SA1, 100SA2, and 100SA3 may be defined in the electronic device 1000. In the sensing regions 100SA1, 100SA2, and 100SA3, the electronic device 1000 may include electronic modules to provide to and/or receive from the outside various types of signals, such as visible light and infrared light. FIG. 1A illustrates an example, in which three sensing regions 100SA1, 100SA2, and 100SA3 are provided, but the number of the sensing regions is not limited to this example.

The sensing regions 100SA1, 100SA2, and 100SA3 may include a first sensing region 100SA1, a second sensing region 100SA2, and a third sensing region 100SA3. For example, the first sensing region 100SA1 may overlap a camera module, the second sensing region 100SA2 and the third sensing region 100SA3 may overlap an ambient light sensor, but exemplary embodiments are not limited to this example.

Each of the electronic modules may receive an external input, which is provided through the first sensing region 100SA1, the second sensing region 100SA2, or the third sensing region 100SA3, or may provide an output to the outside through the first sensing region 100SA1, the second sensing region 100SA2, or the third sensing region 100SA3.

The first sensing region 100SA1 may be enclosed and/or completely surrounded by the active region 1000A, and the second sensing region 100SA2 and the third sensing region 100SA3 may be included in the active region 1000A. For example, the second sensing region 100SA2 and the third sensing region 100SA3 may display an image. Each of the first sensing region 100SA1, the second sensing region 100SA2, and the third sensing region 100SA3 may have a light transmittance (hereinafter "transmittance") that is higher than that of the active region 1000A. In addition, the transmittance of the first sensing region 100SA1 may be higher than the transmittance of each of the second sensing region 100SA2 and the third sensing region 100SA3.

According to an exemplary embodiment, at least one of the electronic modules may overlap the active region 1000A, and others of the electronic modules may be enclosed and/or completely surrounded by the active region 1000A. Thus, it is unnecessary to confine a region, on which the electronic modules will be disposed, within a peripheral region 1000NA around the active region 1000A. As a result, the ratio of an area of the active region 1000A to a total area of the electronic device 1000 may be increased.

Figure 3A:
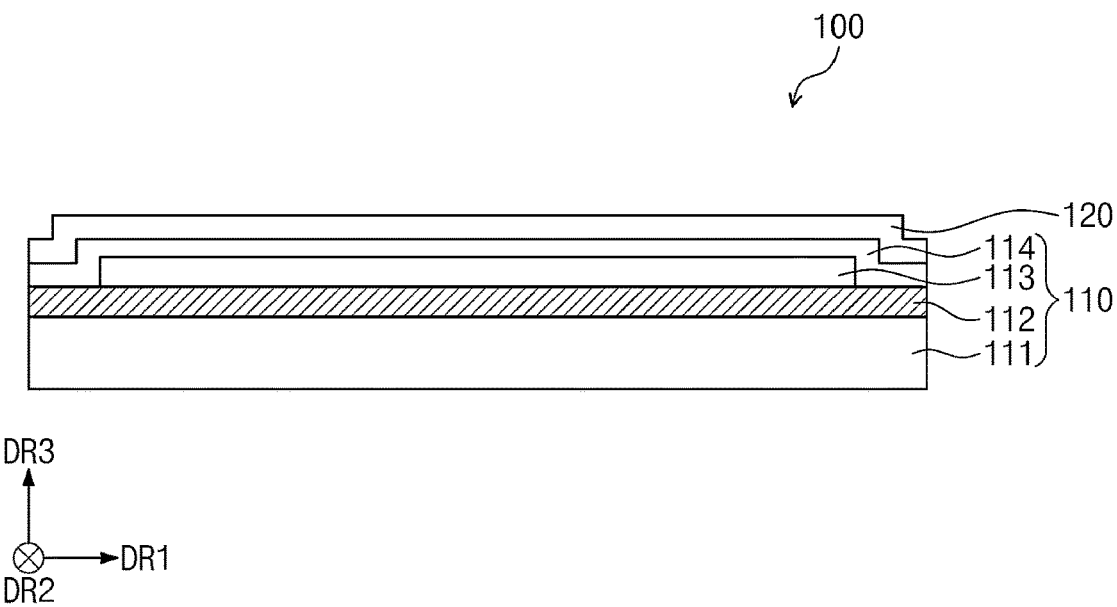
FIG. 3A is a cross-sectional view of an exemplary embodiment of the display panel of FIG. 2.

FIG. 2 is a cross-sectional view taken along line I-I' of FIG. 1A to illustrate an exemplary embodiment of the electronic device. FIG. 3A is a cross-sectional view of an exemplary embodiment of the display panel of FIG. 2.

Referring to FIG. 2, the electronic device 1000 may include a display panel 100, upper functional layers, and lower functional layers.

Referring to FIG. 3A, the display panel 100 may be an element configured to generate an image and to sense an input applied from the outside. For example, the display panel 100 may include a display layer 110 and a sensor layer 120. The thickness of the display panel 100 may range from 25 μm to 35 μm (in particular, about 30 μm), but the thickness of the display panel 100 is not limited thereto.

The display layer 110 may be an element configured to substantially generate an image. The display layer 110 may be a light-emitting type display layer (e.g., an organic light emitting display layer, a quantum dot display layer, or a micro-LED display layer).

The display layer 110 may include a base layer 111, a circuit layer 112, a light-emitting device layer 113, and an encapsulation layer 114.

The base layer 111 may include a synthetic resin film. The synthetic resin layer may include a thermosetting resin. The base layer 111 may have a multi-layered structure. For example, the base layer 111 may have a triple-layered structure including a synthetic resin layer, an adhesive layer, and a synthetic resin layer. The synthetic resin layer may be a polyimide-based resin layer, but exemplary embodiments are not limited to a specific material. The synthetic resin layer may include at least one of acryl resins, methacryl resins, polyisoprene resins, vinyl resins, epoxy resins, urethane resins, cellulose resins, siloxane resins, polyamide resins, or perylene resins. In addition, the base layer 111 may include a glass substrate or a substrate made of an organic/inorganic composite material.

The circuit layer 112 may be disposed on the base layer 111. The circuit layer 112 may include an insulating layer, a semiconductor pattern, a conductive pattern, and a signal line. An insulating layer, a semiconductor layer, and a conductive layer may be formed on the base layer 111 using a coating or depositing process, and then may be selectively patterned through a plurality of photolithography processes. Thereafter, a semiconductor pattern, a conductive pattern, and a signal line included in the circuit layer 112 may be formed.

The light-emitting device layer 113 may be disposed on the circuit layer 112. The light-emitting device layer 113 may include a light-emitting device. For example, the light-emitting device layer 113 may include an organic light emitting material, a quantum dot, a quantum rod, or a micro LED.

The encapsulation layer 114 may be disposed on the light-emitting device layer 113. The encapsulation layer 114 may include an inorganic layer, an organic layer, and an inorganic layer, which are sequentially stacked, but the layers constituting the encapsulation layer 114 are not limited to this example.

The inorganic layers may protect the light-emitting device layer 113 from moisture and oxygen, and the organic layer may protect the light-emitting device layer 113 from a contamination material, such as dust particles. The inorganic layers may include a silicon nitride layer, a silicon oxynitride layer, a silicon oxide layer, a titanium oxide layer, or an aluminum oxide layer. The organic layer may include an acrylic organic layer, but exemplary embodiments are not limited thereto.

The sensor layer 120 may be disposed on the display layer 110. The sensor layer 120 may sense an external input provided from the outside. For example, the external input may be a user input produced by a user. For example, the user input may include various types of external inputs, such as a part of a user's body, light, heat, pressure, or a pen.

The sensor layer 120 may be formed on the display layer 110 through a successive process. In this case, the sensor layer 120 is directly disposed on the display layer 110. This means that a another element is not disposed between the sensor layer 120 and the display layer 110. For example, an additional adhesive member may not be disposed between the sensor layer 120 and the display layer 110.

In exemplary embodiments, the sensor layer 120 may be coupled to the display layer 110 through an adhesive member. The adhesive member may be a typical adhesive or sticking agent.

Referring back to FIG. 2, the upper functional layers may be disposed on the display panel 100. For example, the upper functional layers may include an anti-reflection member 200 and an upper member 300.

The anti-reflection member 200 may be referred to as an anti-reflection layer. The anti-reflection member 200 may reduce reflectance of an external light that is incident from the outside. The anti-reflection member 200 may include an elongated-type synthetic resin film. For example, the anti-reflection member 200 may be provided by dyeing an iodine compound on a polyvinylalcohol (PVA) film. However, the material for the anti-reflection member 200 is not limited to this example. The thickness of the anti-reflection member 200 may range from 25 μm to 35 μm (in particular, about 31 μm), but the thickness of the anti-reflection member 200 is not limited thereto.

The anti-reflection member 200 may be coupled to the display panel 100 through a first adhesive layer 1010. The first adhesive layer 1010 may be a transparent adhesive layer, such as a pressure sensitive adhesive (PSA) film, an optically clear adhesive (OCA) film, or an optically clear resin (OCR). An adhesive layer or agent, which will be described below, may be formed of or include a typical adhesive or sticking agent. The thickness of the first adhesive layer 1010 may range from 20 μm to 30 μm (in particular, 25 μm), but the thickness of the first adhesive layer 1010 is not limited thereto.

In an exemplary embodiment, the first adhesive layer 1010 may be omitted, and in this case, the anti-reflection member 200 may be directly disposed on the display panel 100. In this case, an additional adhesive layer may not be disposed between the anti-reflection member 200 and the display panel 100.

The upper member 300 may be disposed on the anti-reflection member 200. The upper member 300 may include a first hard coating layer 310, a protection layer 320, a first upper adhesive layer 330, a window 340, a second upper adhesive layer 350, a light-blocking layer 360, an impact absorbing layer 370, and a second hard coating layer 380. Elements included in the upper member 300 are not limited to the afore-described elements. In an exemplary embodiment, at least one of the afore-described elements may be omitted, or in another exemplary embodiment, other elements may be added.

The first hard coating layer 310 may be the outermost layer of the electronic device 1000. The first hard coating layer 310 may be a functional layer coated on the protection layer 320, which is used to improve usage properties of the electronic device 1000. For example, due to the first hard coating layer 310, it may be possible to improve anti-fingerprint, contamination-preventing, scratch-preventing properties of the electronic device 1000.

The protection layer 320 may be disposed below the first hard coating layer 310. The protection layer 320 may protect elements disposed below the protection layer 320. The first hard coating layer 310, an anti-fingerprint layer, and so forth may be additionally provided on the protection layer 320 to improve chemical-resistant and wear resistant properties. The protection layer 320 may include a film whose elastic modulus at the room temperature is less than 15 GPa. The thickness of the protection layer 320 may range from 50 μm to 60 μm (in particular, 55 μm), but the thickness of the protection layer 320 is not limited thereto. In an exemplary embodiment, the protection layer 320 may be omitted.

The first upper adhesive layer 330 may be disposed below the protection layer 320. The protection layer 320 and the window 340 may be coupled to each other by the first upper adhesive layer 330. The thickness of the first upper adhesive layer 330 may range from 20 μm to 30 μm (in particular, about 25 μm), but the thickness of the first upper adhesive layer 330 is not limited thereto.

The window 340 may be disposed below the first upper adhesive layer 330. The window 340 may be formed of or include an optically-transparent insulating material. For example, the window 340 may include a glass substrate or a synthetic resin film. In the case where the window 340 is the glass substrate, the thickness of the window 340 may be smaller than or equal to 80 μm or may be, for example, about 30 μm, but the thickness of the window 340 is not limited thereto.

In the case where the window 340 is the synthetic resin film, the window 340 may include a polyimide (PI) film or a polyethylene terephthalate (PET) film.

The window 340 may have a multi- or single-layered structure. For example, the window 340 may include a plurality of synthetic resin films, which are coupled to each other by an adhesive agent, or may include a glass substrate and a synthetic resin film, which are coupled to each other by an adhesive agent.

The second upper adhesive layer 350 may be disposed below the window 340. The window 340 and the impact absorbing layer 370 may be coupled to each other by the second upper adhesive layer 350. The thickness of the second upper adhesive layer 350 may range from 30 μm to 40 μm (in particular, about 35 μm), but the thickness of the second upper adhesive layer 350 is not limited thereto.

In an exemplary embodiment, a sidewall 340S of the window 340 and a sidewall 350S of the second upper adhesive layer 350 may be disposed inside sidewalls of other layers (e.g., a sidewall 1000S of the display panel 100 and a sidewall 320S of the protection layer 320), when viewed in a plan view. This means that the sidewalls 340S and 350S are closer to the active region 1000A than other comparative elements.

The positional relationship between layers may be changed by the folding operation of the electronic device 1000. According to an exemplary embodiment, since the sidewall 340S of the window 340 is disposed inside the sidewall 1000S of the display panel 100 and the sidewall 320S of the protection layer 320, it may be possible to prevent or suppress the sidewall 340S of the window 340 from protruding out of the sidewall 320S of the protection layer 320, even when the positional relationship between layers is changed due to the folding operation. Accordingly, it may be possible to reduce the possibility that the sidewall 340S of the window 340 is used as a pathway of an external impact. As a result, it may be possible to reduce the probability that a crack occurs in the window 340.

A first distance 340W between the sidewall 340S of the window 340 and the sidewall 320S of the protection layer 320 may be greater than a specific distance. Here, the first distance 340W may be a distance that is measured in the first direction DR1. In addition, the first distance 340W may correspond to a distance between the sidewall 340S and the sidewall 320S, when viewed in a plan view.

The first distance 340W may range from 180 μm to 205 μm (in particular, 196 μm), but exemplary embodiments are not limited to this example. In an exemplary embodiment, the first distance 340W may be greater than or equal to 50 μm and may be, for example, about 300 μm. As the first distance 340W increases, the protrusion length of the protection layer 320 relative to the window 340 may increase, and a portion of the protection layer 320 may be bent and may be attached to other elements (e.g., a case). In addition, in the case where an area of the protection layer 320 increases, it may be possible to reduce the probability that contamination material, which is supplied from a region on the protection layer 320, enters the region below the protection layer 320.

Furthermore, the window 340 and the second upper adhesive layer 350 may be adhered to the impact absorbing layer 370 through a lamination process. The areas of the window 340 and the second upper adhesive layer 350 may be smaller than an area of the impact absorbing layer 370, in consideration of the process tolerance in the lamination process. In addition, the area of the second upper adhesive layer 350 may be smaller than the area of the window 340. In an exemplary embodiment, during the process of attaching the window 340, pressure may be exerted on the second upper adhesive layer 350. The second upper adhesive layer 350 may be elongated in the first and second directions DR1 and DR2 by the pressure. Here, to prevent the second upper adhesive layer 350 from protruding out of the window 340, the area of the second upper adhesive layer 350 may be smaller than the area of the window 340.

In the case where the first upper adhesive layer 330 and the second upper adhesive layer 350 are attached to each other, the window 340 may be hardly slipped during the folding operation of the electronic device 1000, and in this case, a buckling phenomenon may occur in the window 340. However, according to an exemplary embodiment, the area of the second upper adhesive layer 350 may be smaller than the area of the window 340. Accordingly, the first upper adhesive layer 330 may not be attached to the second upper adhesive layer 350, and it may be possible to prevent or suppress contamination material from being attached to the second upper adhesive layer 350.

A second distance 350W between the sidewall 350S of the second upper adhesive layer 350 and the sidewall 320S of the protection layer 320 may be greater than a specific distance. Here, the second distance 350W may be a distance that is measured in the first direction DR1. In addition, the second distance 350W may correspond to the distance between the sidewall 350S and the sidewall 320S, when viewed in a plan view.

In an exemplary embodiment, the second distance 350W may be about 392 μm, but exemplary embodiments are not limited thereto. For example, the second distance 350W may be within a range from 292 μm to 492 μm.

The impact absorbing layer 370 may be a functional layer used to protect the display panel 100 from an external impact. The impact absorbing layer 370 may be selected from one of films whose elastic modulus at the room temperature is greater than or equal to 1 GPa. The impact absorbing layer 370 may be an elongated film having an optical function. For example, the impact absorbing layer 370 may be an optic axis control film. The impact absorbing layer 370 may be, for example, a biaxially-oriented PET film. The thickness of the impact absorbing layer 370 may range from 35 μm to 45 μm (in particular, about 41 μm), but the thickness of the impact absorbing layer 370 is not limited thereto. In an exemplary embodiment, the impact absorbing layer 370 may be omitted.

The second hard coating layer 380 may be formed on a surface of the impact absorbing layer 370. The second hard coating layer 380 may include an organic coating agent, an inorganic coating agent, or a coating agent made of an organic/inorganic composite material, and if any material is used to reduce a haze issue, it may be used for the second hard coating layer 380. The term 'haze' may be defined as the extent of diffusion of light that is incident into a test material, and if the haze is high, the light may be scattered to cause an opaque haze issue.

Each of the top and bottom surfaces of the impact absorbing layer 370 may include an uneven portion and/or surface. The top surface of the impact absorbing layer 370 may be in contact with the second upper adhesive layer 350. Accordingly, the uneven portion of the top surface of the impact absorbing layer 370 may be filled with the second upper adhesive layer 350. Thus, it may be possible to prevent an optical issue (e.g., an increase in haze) from occurring on the top surface of the impact absorbing layer 370. The bottom surface of the impact absorbing layer 370 may be planarized by the second hard coating layer 380. In the case where a first hole 101H (e.g., see FIG. 4A) is provided to cut a second adhesive layer 1020, the bottom surface exposed by the first hole 101H (e.g., see FIG. 4A) may have a substantially smooth surface. Since the second hard coating layer 380 covers an uneven and/or rough surface of the impact absorbing layer 370, it may be possible to suppress a haze issue which may occur in the uneven and/or rough surface.

The light-blocking layer 360 may be disposed between the impact absorbing layer 370 and the second upper adhesive layer 350. The light-blocking layer 360 may be provided on the top surface of the impact absorbing layer 370 by a printing method. The light-blocking layer 360 may overlap the peripheral region 1000NA. The light-blocking layer 360 may be a colored layer formed by a coating method. The light-blocking layer 360 may include a polymer resin and a pigment contained in the polymer resin. In an exemplary embodiment, the polymer resin may be an acrylic resin or polyester, and the pigment may be a carbon-based pigment. However, the material for the light-blocking layer 360 is not limited to this example.

The light-blocking layer 360 may be formed by a printing method, after forming the second hard coating layer 380 on the impact absorbing layer 370. Since the impact absorbing layer 370 has an uneven and/or rough surface, compared with the second hard coating layer 380, the adhesive strength may be stronger when the light-blocking layer 360 is printed on the impact absorbing layer 370 than when the light-blocking layer 360 is printed on the second hard coating layer 380. Since the light-blocking layer 360 is directly printed on the uneven and/or rough surface of the impact absorbing layer 370, the probability that the light-blocking layer 360 is detached from the impact absorbing layer 370 may be reduced. That is, since the probability that the light-blocking layer 360 becomes detached from a print-target surface (e.g., the impact absorbing layer 370) is reduced, the product reliability of the electronic device 1000 may be improved.

The upper member 300 may be coupled to the anti-reflection member 200 by the second adhesive layer 1020. The second adhesive layer 1020 may be formed of or include a typical adhesive or sticking agent. The thickness of the second adhesive layer 1020 may range from 20 µm to 30 µm (in particular, about 25 µm), but the thickness of the second adhesive layer 1020 is not limited thereto.

The lower functional layers may be disposed on the display panel 100. For example, the lower functional layers may include a lower protection film 400, a cushion member 500, a first lower member 600, a second lower member 700, and a height-difference compensation member 800. Elements included in the lower functional layers are not limited to the afore-described elements. In an exemplary embodiment, at least one of the afore-described elements may be omitted, or in another exemplary embodiment, other element may be added.

The lower protection film 400 may be coupled to the rear surface of the display panel 100 by a third adhesive layer 1030. The lower protection film 400 may prevent a scratch from being formed on the rear surface of the display panel 100, during the fabrication process of the display panel 100. The lower protection film 400 may be a colored polyimide film. For example, the lower protection film 400 may be an opaque yellow film, but exemplary embodiments are not limited to this example.

The thickness of the lower protection film 400 may range from 30 µm to 50 µm (in particular, about 40 µm). The thickness of the third adhesive layer 1030 may range from 13 µm to 25 µm (in particular, about 18 µm). However, the thickness of the lower protection film 400 and the thickness of the third adhesive layer 1030 are not limited thereto.

The cushion member 500 may be disposed below the lower protection film 400. The cushion member 500 may protect the display panel 100 from an impact provided through the underlying element. The impact-resistant property of the electronic device 1000 may be improved by the cushion member 500.

The cushion member 500 may include a first cushion adhesive layer 510, a barrier film 520, a cushion layer 530, and a second cushion adhesive layer 540. Elements included in the cushion member 500 are not limited to the afore-described elements. In an exemplary embodiment, at least one of the afore-described elements may be omitted, or in another exemplary embodiment, other element may be added.

The first cushion adhesive layer 510 and the second cushion adhesive layer 540 may be formed of or include a typical adhesive or sticking agent. The first cushion adhesive layer 510 may be attached to the lower protection film 400, and the second cushion adhesive layer 540 may be attached to the first lower member 600. The thickness of the first cushion adhesive layer 510 may range from 20 µm to 30 µm (in particular, about 25 µm). The thickness of the second cushion adhesive layer 540 may range from 4 µm to 15 µm (in particular, about 8 µm). However, the thicknesses of the first cushion adhesive layer 510 and the second cushion adhesive layer 540 are not limited thereto.

The barrier film 520 may improve an impact-resistant property. The barrier film 520 may prevent the display panel 100 from being deformed. The barrier film 520 may be a synthetic resin film (e.g., a polyimide film), but exemplary embodiments are not limited to this example. The thickness of the barrier film 520 may range from 30 µm to 40 µm (in particular, about 35 µm), but the thickness of the barrier film 520 is not limited thereto.

The cushion layer 530 may include, for example, a foam or a sponge. The foam may include a polyurethane foam or a thermoplastic polyurethane foam. In the case where the cushion layer 530 includes the foam, the cushion layer 530 may be formed by using the barrier film 520 as a base layer. For example, the cushion layer 530 may be formed by foaming a foaming agent on the barrier film 520.

The thickness of the cushion layer 530 may range from 80 µm to 120 µm (in particular, about 100 µm), but the thickness of the cushion layer 530 is not limited thereto.

At least one of the barrier film 520 and the cushion layer 530 may have a color absorbing light. For example, at least one of the barrier film 520 and the cushion layer 530 may be black. In this case, it may be possible to prevent elements, which are disposed below the cushion member 500, from being recognized by a user.

The first lower member 600 may be disposed below the cushion member 500. The first lower member 600 may include a plate 610, a lower adhesive layer 620, and a cover layer 630. Elements included in the first lower member 600 are not limited to the afore-described elements. In an exemplary embodiment, at least one of the afore-described elements may be omitted, or in another exemplary embodiment, other element may be added.

The plate 610 may be formed of or include a material whose elastic modulus at the room temperature is greater than or equal to 60 GPa. For example, the plate 610 may be SUS304, but exemplary embodiments are not limited to this example. The plate 610 may support element disposed thereon. In addition, the heat-dissipation performance of the electronic device 1000 may be improved by the plate 610.

An opening 611 may be defined in a portion of the plate 610. The opening 611 may be defined in a region overlapped with the second region 1000A2. When viewed in a plan view or in the third direction DR3, the opening 611 may overlap the second region 1000A2. A shape of a portion of the plate 610 may be more easily deformed by the opening 611.

The cover layer 630 may be attached to the plate 610 by the lower adhesive layer 620. The lower adhesive layer 620 may be formed of or include a typical adhesive or sticking agent. The cover layer 630 may cover the opening 611 of the plate 610. Accordingly, it may be possible to further prevent a contamination material from entering the opening 611.

The cover layer 630 may be formed of or include a material, whose elastic modulus is lower than that of the plate 610. For example, the cover layer 630 may be formed of or include thermoplastic polyurethane, but exemplary embodiments are not limited to this example.

The thickness of the plate 610 may range from 120 µm to 180 µm (in particular, about 150 µm). The thickness of the lower adhesive layer 620 may range from 4 µm to 15 µm (in particular, about 8 µm). The thickness of the cover layer 630 may range from 4 µm to 15 µm (in particular, about 8 µm). However, the thickness of the plate 610, the thickness of the lower adhesive layer 620, and the thickness of the cover layer 630 are not limited to the afore-described values.

The second lower members 700 may be disposed below the first lower member 600. The second lower members 700 may be spaced apart from each other. For example, one of the second lower members 700 may be disposed in the first region 1000A1, and another of the second lower members 700 may be disposed in the third region 1000A3.

Each of the second lower members 700 may be attached to the first lower member 600 by fourth adhesive layers 1040. For example, one of the fourth adhesive layers 1040 may be attached to a bottom surface of the first lower member 600, which is overlapped with the first region 1000A1, and another of the fourth adhesive layers 1040 may be attached to the bottom surface of the first lower member 600, which is overlapped with the third region 1000A3. In other words, the fourth adhesive layers 1040 may not overlap the second region 1000A2. The thickness of each of the fourth adhesive layers 1040 may range from 8 µm to 15 µm (in particular, about 8 µm), but the thickness of each of the fourth adhesive layers 1040 is not limited thereto.

In an exemplary embodiment, a height-difference compensation film may be further disposed between each of the second lower members 700 and the first lower member 600. For example, the height-difference compensation film may be provided in a region overlapped with the second region 1000A2. A surface (hereinafter, a first surface) of the height-difference compensation film may have an adhesive strength that is lower than another surface. For example, the first surface may not have adhesive strength. The first surface may be a surface that faces the first lower member 600.

Each of the second lower members 700 may include a lower plate 710, a heat-dissipation sheet 720, and an insulating film 730. Elements included in each of the second lower members 700 are not limited to the afore-described elements. In an exemplary embodiment, at least one of the afore-described elements may be omitted, or in another exemplary embodiment, other element may be added.

In an exemplary embodiment, a plurality of the lower plates 710 may be provided. One of the lower plates 710 may overlap the first region 1000A1 and a portion of the second region 1000A2, and another of the lower plates 710 may overlap another portion of the second region 1000A2 and the third region 1000A3.

The lower plates 710 may be spaced apart from each other, in the second region 1000A2. The lower plates 710 may be disposed as close as possible to each other and may support a region, in which the opening 611 of the plate 610 is formed. For example, the lower plates 710 may prevent a shape of a region, in which the opening 611 of the plate 610 is defined from being changed by pressure exerted by an element thereon.

In addition, the lower plates 710 may prevent elements disposed on the second lower members 700 from being deformed by elements disposed below the second lower members 700.

Each of the lower plates 710 may include a metal alloy (e.g., copper alloy). However, the material for the lower plates 710 is not limited to this example. The thickness of each of the lower plates 710 may range from 60 µm to 100 µm (in particular, about 80 µm), but exemplary embodiments are not limited to this thickness of the lower plates 710.

The heat-dissipation sheet 720 may be attached to a bottom surface of the lower plate 710. The heat-dissipation sheet 720 may be a thermal conduction sheet having high thermal conductivity. For example, the heat-dissipation sheet 720 may include a heat-dissipation layer 721, a first heat-dissipation adhesive layer 722, a second heat-dissipation adhesive layer 723, and a gap tape 724.

The gap tape 724 may be attached to the first heat-dissipation adhesive layer 722 and the second heat-dissipation adhesive layer 723, which are spaced apart from each other with the heat-dissipation layer 721 interposed therebetween. The gap tape 724 may be composed of a plurality of layers. For example, the gap tape 724 may include a substrate layer, an upper adhesive layer disposed on a top surface of the substrate layer, and a lower adhesive layer disposed on a bottom surface of the substrate layer.

The heat-dissipation layer 721 may be attached to the lower plate 710 by the first heat-dissipation adhesive layer 722. The heat-dissipation layer 721 may be hermetically sealed by the first heat-dissipation adhesive layer 722, the second heat-dissipation adhesive layer 723, and the gap tape 724. The heat-dissipation layer 721 may be a graphited polymer film. The polymer film may be, for example, a polyimide film. The thickness of each of the first heat-dissipation adhesive layer 722 and the second heat-dissipation adhesive layer 723 may range from 3 µm to 8 µm (in particular, about 5 µm). The thickness of each of the heat-dissipation layer 721 and the gap tape 724 may range from 10 µm to 25 µm (in particular, about 17 µm). However, the thickness of each of the first heat-dissipation adhesive layer 722, the second heat-dissipation adhesive layer 723, the heat-dissipation layer 721, and the gap tape 724 may be not limited to the afore-described ranges or values.

The insulating film 730 may be attached to a bottom surface of the heat-dissipation sheet 720. For example, the insulating film 730 may be attached to the second heat-dissipation adhesive layer 723. The insulating film 730 may prevent rattling noises from occurring in the electronic device 1000. The thickness of the insulating film 730 may be about 15 µm, but exemplary embodiments are not limited to this example.

The height-difference compensation member 800 may be attached to a bottom surface of the plate 610. For example, the lower adhesive layer 620 may be attached to a bottom surface of a portion of the plate 610, and the height-difference compensation member 800 may be attached to a bottom surface of another portion of the plate 610.

The height-difference compensation member 800 may include a first compensation adhesive layer 810, a height-difference compensation film 820, and a second compensation adhesive layer 830. The first compensation adhesive layer 810 may be attached to a bottom surface of the plate 610. The height-difference compensation film 820 may be a synthetic resin film. The second compensation adhesive layer 830 may be attached to the bottom surface of the height-difference compensation film 820 and a set. The thickness of each of the first compensation adhesive layer 810 and the second compensation adhesive layer 830 may range from 13 µm to 25 µm (in particular, about 17 µm). The thickness of each of the first compensation adhesive layer 810 and the second compensation adhesive layer 830 is not limited to this example, and the thickness of the height-difference compensation film 820 may be determined depending on the thicknesses of the first and second compensation adhesive layers 810 and 830.

Figure 3B:
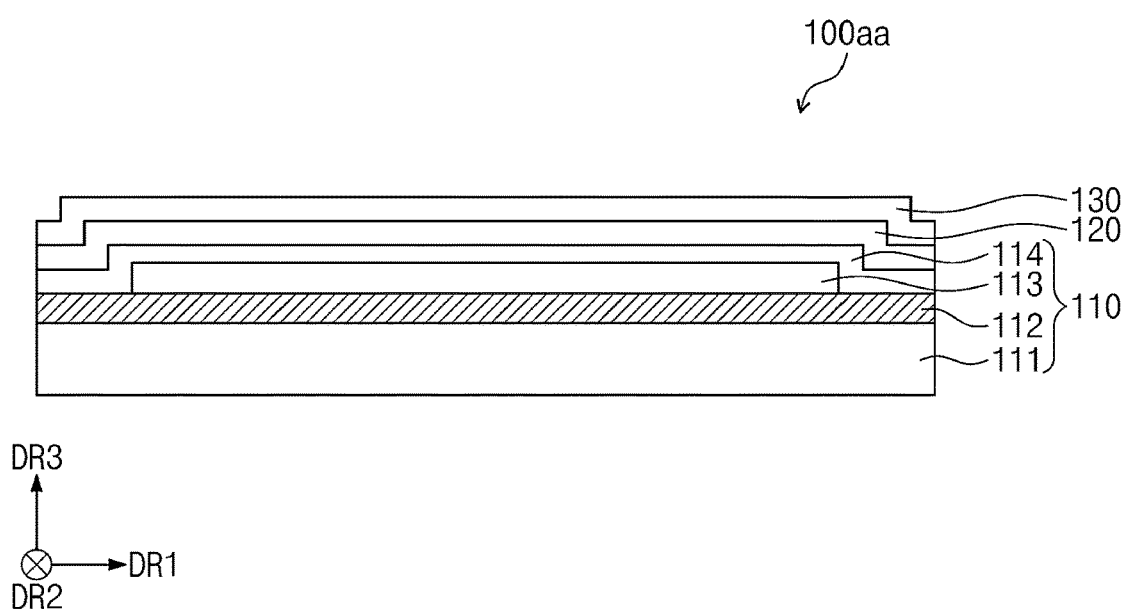
FIG. 3B is a cross-sectional view of another exemplary embodiment of the display panel of FIG. 2.

FIG. 3B is a cross-sectional view of another exemplary embodiment of the display panel of FIG. 2.

Referring to FIG. 3B, a display panel 100aa may further include an anti-reflection layer 130, when compared with the display panel 100 described with reference to FIG. 3A. In this case, the anti-reflection member 200 (e.g., see FIG. 2) and the first adhesive layer 1010 (e.g., see FIG. 2) may be omitted from the electronic device 1000 (e.g., see FIG. 2) including the display panel 100*aa*.

The display panel 100*aa* may include the display layer 110, the sensor layer 120, and the anti-reflection layer 130.

In an exemplary embodiment, the anti-reflection layer 130 may include color filters. The color filters may be arranged in a specific arrangement. The arrangement of the color filters may be determined in consideration of colors of lights to be emitted from pixels in the display layer 110. In addition, the anti-reflection layer 130 may further include a black matrix, which is disposed adjacent to the color filters.

In an exemplary embodiment, the anti-reflection layer 130 may include a destructive interference structure. For example, the destructive interference structure may include a first reflection layer and a second reflection layer which are provided on different layers. The first reflection layer and the second reflection layer may allow a first reflection light and a second reflection light, which are respectively reflected by them, to destructively interfere with each other, and this may make it possible to reduce reflectance of the external light.

Figure 4A:
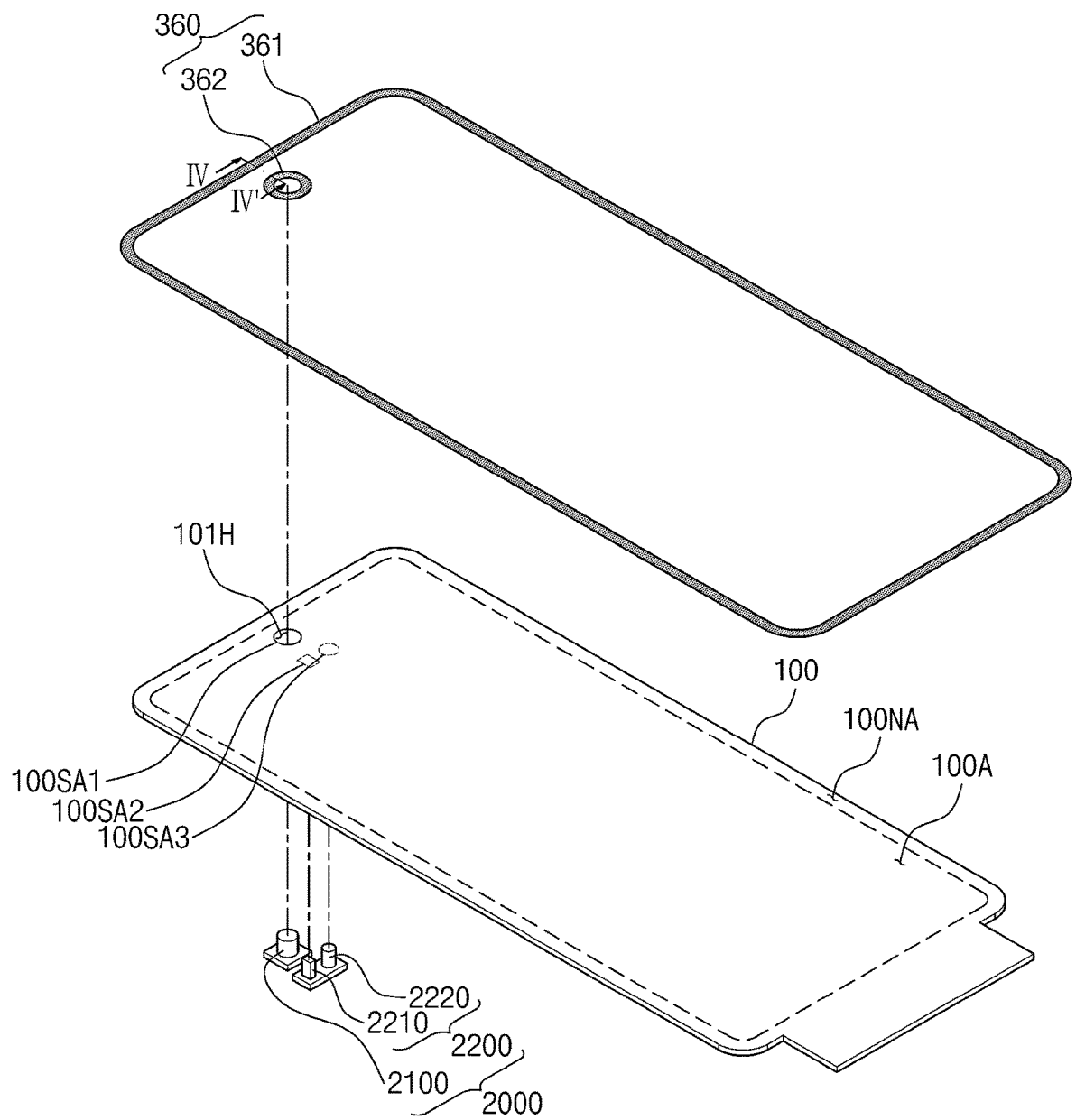
FIG. 4A is an exploded perspective view illustrating an exemplary embodiment of some elements of the electronic device of FIG. 1A.

FIG. 4A is an exploded perspective view illustrating an exemplary embodiment of some elements of the electronic device of FIG. 1A.

FIG. 4A exemplarily illustrates the light-blocking layer 360, the display panel 100, and electronic modules 2000 of the electronic device 1000 of FIG. 2. The electronic modules 2000 may include a camera module 2100 and an ambient light sensor 2200.

The ambient light sensor 2200 may include a light-emitting module 2210 and a light-receiving module 2220. The light-emitting module 2210 and the light-receiving module 2220 may be mounted on a single substrate. The light-emitting module 2210 may be configured to generate and output light. For example, the light-emitting module 2210 may emit infrared light, and the light-emitting module 2210 may include a light-emitting diode. The light-receiving module 2220 may sense infrared light. The light-receiving module 2220 may be activated when the level of the infrared light is higher than a specific level. The light-receiving module 2220 may include a CMOS sensor. The infrared light emitted from the light-emitting module 2210 may be reflected by an external object (e.g., a user's finger or face) and may be incident into the light-receiving module 2220.

An active region 100A and a peripheral region 100NA may be defined in the display panel 100. The active region 100A may correspond to the active region 1000A shown in FIG. 1A, and the peripheral region 100NA may correspond to the peripheral region 1000NA shown in FIG. 1A.

The first sensing region 100SA1 overlapped with the camera module 2100 may be at least partially enclosed and/or completely surrounded by the active region 100A, and the second sensing region 100SA2 and the third sensing region 100SA3, which are respectively overlapped with the light-emitting module 2210 and the light-receiving module 2220, may be portions of the active region 100A.

The first hole 101H may be defined in a portion of the display panel 100. The first hole 101H may be at least partially surrounded by the active region 100A. The first hole 101H may correspond to the first sensing region 100SA1. As such, the camera module 2100 may receive an external light input, which is provided through the first hole 101H.

The electronic device 1000 may include light-blocking elements disposed on the display panel 100 to block light. The light-blocking elements to block light may be associated with the peripheral region 100NA and the first hole 101H. In an exemplary embodiment, the light-blocking layer 360 may include a first light-blocking element in the form of a first light-blocking pattern 361 and a second light-blocking element in the form of a second light-blocking pattern 362. The first light-blocking pattern 361 may be a pattern covering and/or overlapping the peripheral region 100NA. The second light-blocking pattern 362 may be disposed near and/or adjacent to the first hole 101H. At least portion of the second light-blocking pattern 362 may overlap the first hole 101H. When viewed in a plan view, the second light-blocking pattern 362 may enclose and/or completely surround the camera module 2100. In addition, the second light-blocking pattern 362 may be enclosed and/or completely surrounded by the active region 100A.

The first light-blocking pattern 361 and the second light-blocking pattern 362 may be disposed on the same layer. For example, the first light-blocking pattern 361 and the second light-blocking pattern 362 may be formed concurrently by the same process. The first light-blocking pattern 361 may be referred to as a peripheral light-blocking pattern, and the second light-blocking pattern 362 may be referred to as a light-blocking pattern.

FIG. 4B is a cross-sectional view taken along line IV-IV' of FIG. 4A to illustrate an exemplary embodiment of the electronic device.

Referring to FIGS. 4A and 4B, the first light-blocking pattern 361 and the second light-blocking pattern 362 may have different thicknesses from each other. For example, a first thickness TK1 of the first light-blocking pattern 361 may be greater than a second thickness TK2 of the second light-blocking pattern 362. The first thickness TK1 may be greater than the second thickness TK2 and may be smaller than or equal to 10 times the second thickness TK2, and in an exemplary embodiment, the first thickness TK1 may be great than or equal to 3 times the second thickness TK2 and may be smaller than or equal to 10 times the second thickness TK2. However, the range of the second thickness TK2 is not limited thereto. For example, the second thickness TK2 may range from 0.5 μm to 1.5 μm, the first thickness TK1 may range from 1.5 μm to 5 μm, but exemplary embodiments are not limited to this example. For example, the first light-blocking pattern 361 may be about 4 μm, and the second light-blocking pattern 362 may be about 1 μm.

In the case where the second thickness TK2 is smaller than 0.5 μm, the second light-blocking pattern 362 may not block an external light sufficiently. In addition, in the case where the second thickness TK2 is greater than 1.5 μm, an uneven portion may be formed in layers covering the second light-blocking pattern 362 by the second light-blocking pattern 362. In the case where an uneven portion is formed in the layers, the sharpness of an image obtained by the camera module 2100 may be deteriorated.

According to an exemplary embodiment, the first light-blocking pattern 361 and the second light-blocking pattern 362 may be designed to have different thicknesses from each other. The first thickness TK1 may be designed to be thicker than the second thickness TK2. Accordingly, the peripheral region 100NA may be covered with the first light-blocking pattern 361 such that light may be blocked sufficiently. In addition, the second thickness TK2 may be designed to be thinner than the first thickness TK1. As the second thickness TK2 of the second light-blocking pattern 362 becomes thinner, curvature and/or an uneven portion generated in the layers covering the second light-blocking pattern 362 may be reduced and therefore the layers may be planarized. Accordingly, it may be possible to prevent or reduce an uneven portion from being formed in a region, which is overlapped with the camera module 2100. As a result, it may be possible to prevent deterioration of the quality of images obtained by the camera module 2100.

The width 361TW of the first light-blocking pattern 361 may be greater than the width 362TW of the second light-blocking pattern 362. For example, the width 361TW of the first light-blocking pattern 361 may be equal to or greater than 0.67 mm, and the width 362TW of the second light-blocking pattern 362 may be about 0.52 mm. However, the width 361TW of the first light-blocking pattern 361 and the width 362TW of the second light-blocking pattern 362 are not limited to these values.

The first light-blocking pattern 361 may be disposed in the peripheral region 1000NA (e.g., see FIG. 2) of the electronic device 1000 (e.g., see FIG. 2), and the second light-blocking pattern 362 may be disposed in the active region 1000A (e.g., see FIG. 1A) of the electronic device 1000 (e.g., see FIG. 2). Thus, the first light-blocking pattern 361 may be covered with another element (e.g., a case) during the process of assembling the electronic device 1000 or may be partially cut by an additional cutting process. Accordingly, the first light-blocking pattern 361 may be designed to have a width greater than the second light-blocking pattern 362.

FIG. 4C is a cross-sectional view taken along line IV-IV' of FIG. 4A to illustrate another exemplary embodiment of the electronic device.

Referring to FIGS. 4A and 4C, the first light-blocking pattern 361 may include one or more stacked layers in the form of printing layers 361L1, 361L2, and 361L3 stacked on the impact absorbing layer 370, and the second light-blocking pattern 362 may include one or more stacked layers in the form of a printing layer 362L disposed on the impact absorbing layer 370. The number of the printing layers 361L1, 361L2, and 361L3 in the first light-blocking pattern 361 may be different from the number of a printing layer 362L in the second light-blocking pattern 362. In FIG. 4C, one printing layer may mean a layer that is formed by a single printing process.

The first light-blocking pattern 361 may be provided by a triple color printing, and the second light-blocking pattern 362 may be provided by a single color printing. That is, the repetition number of the printing process to form the first light-blocking pattern 361 may be greater than that of the printing process to form the second light-blocking pattern 362.

The number of layers included in each of the first and second light-blocking patterns 361 and 362 may not be limited to the example of FIG. 4C, as long as the number of printing layers constituting the first light-blocking pattern 361 is greater the number of printing layers constituting the second light-blocking pattern 362.

FIG. 5 is a rear view of an exemplary embodiment of some elements of the electronic device of FIG. 1A.

The display panel 100, the height-difference compensation member 800, the heat-dissipation layer 721, and the gap tape 724 are exemplarily illustrated in FIG. 5.

Referring to FIGS. 4A and 5, a first hole 101H, a second hole 102H, and a third hole 103H may correspond to the first sensing region 100SA1, the second sensing region 100SA2, and the third sensing region 100SA3, respectively.

The first hole 101H, the second hole 102H, and the third hole 103H may be formed by removing some elements of the electronic device 1000 (e.g., see FIG. 1A), and this will be described in more detail below.

The first hole 101H may overlap the height-difference compensation member 800, and each of the second hole 102H and the third hole 103H may overlap the gap tape 724. Accordingly, when viewed in a plan view, the first hole 101H may be enclosed and/or completely surrounded by the height-difference compensation member 800, and each of the second hole 102H and the third hole 103H may be enclosed and/or completely surrounded by the gap tape 724.

Figure 6:
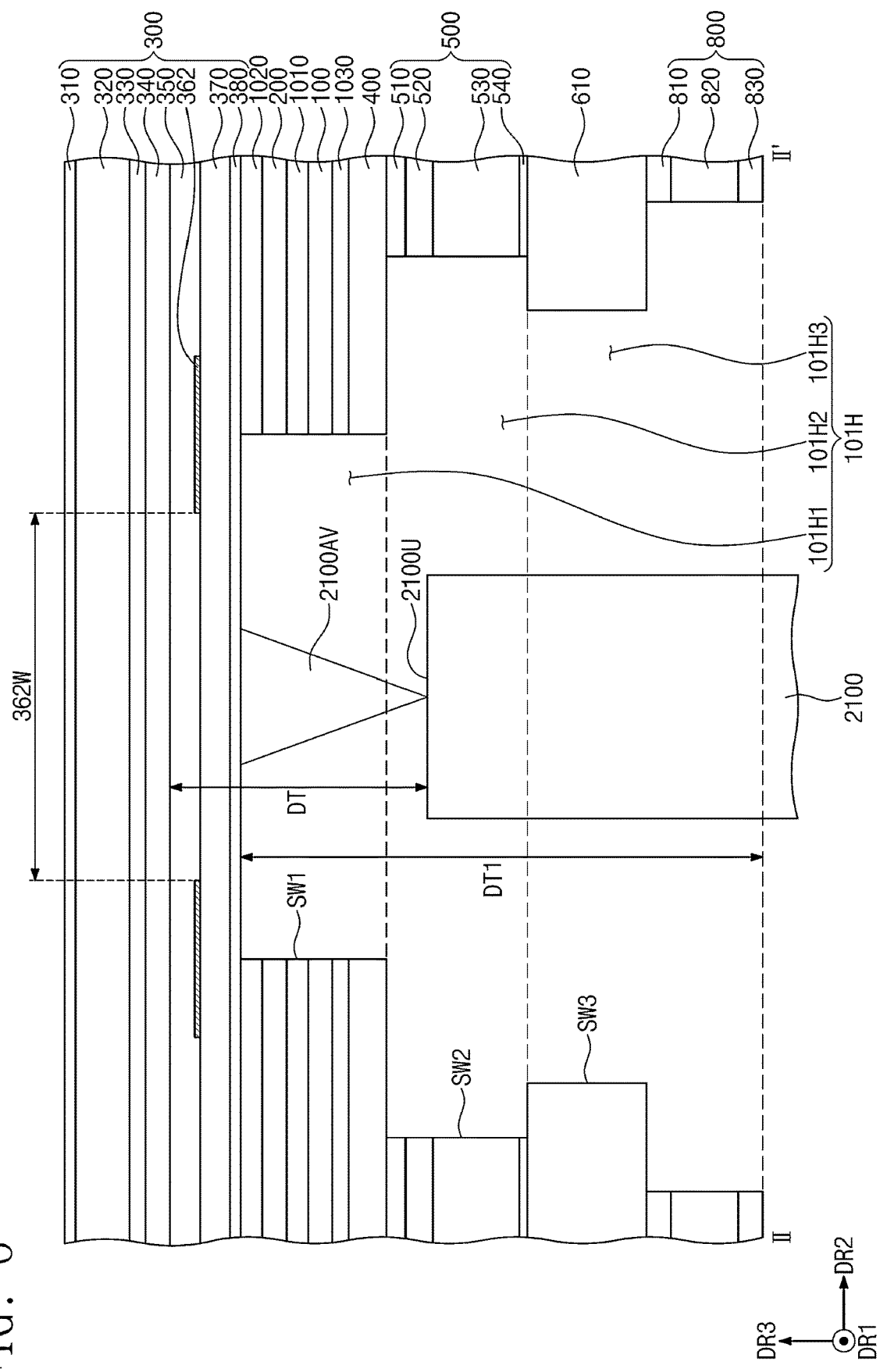
FIG. 6 is a cross-sectional view taken along line II-II' of FIG. 1A to illustrate an exemplary embodiment of the electronic device.

FIG. 6 is a cross-sectional view taken along line II-II' of FIG. 1A to illustrate an exemplary embodiment of the electronic device.

FIG. 6 illustrates the first hole 101H, in which the camera module 2100 is inserted. The first hole 101H may include a first hole portion 101H1, a second hole portion 101H2, and a third hole portion 101H3.

The first hole portion 101H1 may be defined by a first sidewall SW1, the second hole portion 101H2 may be defined by a second sidewall SW2, and the third hole portion 101H3 may be defined by a third sidewall SW3.

The first hole portion 101H1, the second hole portion 101H2, and the third hole portion 101H3 may have different sizes from each other. For example, the first hole portion 101H1 may have the smallest size, the second hole portion 101H2 may have the largest size, and the third hole portion 101H3 may have a size between the sizes of the first and second hole portions 101H1 and 101H2.

The first hole portion 101H1 may be formed by a laser cutting process. For example, a laser may be used to cut the layers from the lower protection film 400 to the second adhesive layer 1020. The second hole portion 101H2 may be provided in the cushion member 500, and in an exemplary embodiment, the second hole portion 101H2 may be formed by a shearing process on the cushion member 500. The cushion member 500 with the second hole portion 101H2 may be attached to the lower protection film 400. The third hole portion 101H3 may be formed by a shearing process on the plate 610 and the height-difference compensation member 800.

According to an exemplary embodiment, the cushion member 500 with the second hole portion 101H2 may be attached to the plate 610 with the third hole portion 101H3, and then, the cushion member 500 may be attached to the lower protection film 400. Thus, the first hole portion 101H1, the second hole portion 101H2, and the third hole portion 101H3 may be formed to have different sizes from each other, in consideration of the part tolerance, the apparatus tolerance, and the folding tolerance.

The folding tolerance may be tolerance caused by the folding operation of the electronic device 1000. For example, the folding tolerance may be determined in consideration of a movement distance (or slip) of each element, when the electronic device 1000 is fully folded, and an unrestored movement distance of each element, when the electronic device 1000 is unfolded after the folding operation.

According to an exemplary embodiment, since the sizes of the first hole portion 101H1, the second hole portion 101H2, and the third hole portion 101H3 are determined in consideration of the folding tolerance, any interference issue may not occur between an inner sidewall of the first hole 101H and an electronic module (e.g., the camera module 2100) inserted in the first hole 101H. In addition, the second light-blocking pattern 362, which is provided to correspond to the position of the first hole 101H, may also be disposed in consideration of the folding tolerance. Thus, even when the electronic device 1000 is folded and unfolded, it may be possible to reduce the probability that the second light-blocking pattern 362 veils the active region 100A (e.g., see FIG. 4A) of the display panel 100 or veils a view angle region 2100AV of the camera module 2100.

According to an exemplary embodiment, the second light-blocking pattern 362 may be directly disposed on the impact absorbing layer 370, and the second hard coating layer 380 may be directly disposed under the impact absorbing layer 370. Thus, the second light-blocking pattern 362 may be in contact with the impact absorbing layer 370, and the second hard coating layer 380 may be in contact with the impact absorbing layer 370. The impact absorbing layer 370 may be disposed between the second light-blocking pattern 362 and the second hard coating layer 380.

The second light-blocking pattern 362 may be formed by a printing method, after forming the second hard coating layer 380 on the impact absorbing layer 370. Since the impact absorbing layer 370 has an uneven and/or rough surface, compared with the second hard coating layer 380, an adhesive strength may be stronger when the second light-blocking pattern 362 is printed on the impact absorbing layer 370 than when the second light-blocking pattern 362 is printed on the second hard coating layer 380. Since the second light-blocking pattern 362 is directly printed on the uneven surface and/or rough surface of the impact absorbing layer 370, the probability that the second light-blocking pattern 362 is detached from the impact absorbing layer 370 may be reduced.

The camera module 2100 may be inserted in the first hole 101H. The second upper adhesive layer 350, the light-blocking layer 360, the impact absorbing layer 370, and the second hard coating layer 380 may be disposed between the camera module 2100 and the window 340. Since at least one layer is disposed between the camera module 2100 and the window 340, the possibility that the window 340 is damaged by the camera module 2100 may be reduced. Accordingly, product reliability of the electronic device may be improved.

A top surface 2100U of the camera module 2100 may be located in the second hole portion 101H2 provided in the cushion member 500. The second hole portion 101H2 may have the largest diameter, among the first to third hole portions 101H1, 101H2, and 101H3. Thus, even when the positional relationship between layers is changed by the folding of the electronic device 1000, the probability of the camera module 2100 colliding with the second sidewall SW2 may be reduced. Accordingly, product reliability of the electronic device may be improved.

The position of the top surface 2100U of the camera module 2100 is not limited to an example of FIG. 6. For example, the top surface 2100U of the camera module 2100 may be disposed in the first hole portion 101H1. In this case, the width 362W of the region enclosed and/or completely surrounded by the second light-blocking pattern 362 may be designed to have a reduced value, compared with the case that the top surface 2100U of the camera module 2100 is disposed in the second hole portion 101H2.

For example, the second light-blocking pattern 362 may be designed, such that the second light-blocking pattern 362 is not overlapped with the view angle region 2100AV of the camera module 2100. When viewed in a plan view, the second light-blocking pattern 362 may be spaced apart from the view angle region 2100AV of the camera module 2100 by a specific distance, in consideration of process tolerance. Since a distance between the camera module 2100 and the second light-blocking pattern 362 is reduced, the second light-blocking pattern 362 may not block or veil the view angle region 2100AV of the camera module 2100, even when the width 362W of the region enclosed and/or completely surrounded by the second light-blocking pattern 362 is reduced.

According to an exemplary embodiment, the distance DT between the camera module 2100 and the window 340 may be maintained to a value that is greater than a predetermined distance. In the case where the distance DT between the camera module 2100 and the window 340 is maintained to be greater than the predetermined distance, the probability that the window 340 is damaged by the camera module 2100 may be reduced. Accordingly, product reliability of the electronic device may be improved. The damage may be a crack, when the window 340 is a glass substrate and may be a dent, when the window 340 is a synthetic resin film.

For example, the distance DT may range from 60% to 200% of the sum of thicknesses of elements, which have the first holes 101H defined therein and have moduli smaller than a reference modulus. In FIG. 6, the elements with the first holes 101H may correspond to elements that are disposed below the second hard coating layer 380. The reference modulus may be less than 100 MPa, and in an exemplary embodiment, the reference modulus may range from 0 MPa to 50 MPa.

The elements satisfying such a condition may be the first adhesive layer 1010, the second adhesive layer 1020, the third adhesive layer 1030, the first cushion adhesive layer 510, the cushion layer 530, the second cushion adhesive layer 540, the first compensation adhesive layer 810, and the second compensation adhesive layer 830.

In an exemplary embodiment, The thickness of the first adhesive layer 1010 may be about 25 µm, the thickness of the second adhesive layer 1020 may be about 25 µm, the thickness of the third adhesive layer 1030 may be about 18 µm, the thickness of the first cushion adhesive layer 510 may be about 25 µm, the thickness of the cushion layer 530 may be about 100 µm, the thickness of the second cushion adhesive layer 540 may be about 8 µm, the thickness of the first compensation adhesive layer 810 may be about 17 µm, and the thickness of the second compensation adhesive layer 830 may be about 17 µm. Each of the thicknesses may have a process error. Thus, the sum of the thicknesses may range from 183 µm to 300 µm (in particular, about 235 µm). However, the sum of the thicknesses is not limited thereto.

The distance DT between the camera module 2100 and the window 340 may be determined in consideration of the highest compressibility of layers having moduli less than a reference modulus. For example, the distance DT may be greater than a value that is obtained by multiplying a sum of the thicknesses by the highest compressibility. The distance DT may be larger than 110 µm (e.g., larger than 141 µm).

According to an exemplary embodiment, even the elements are maximally compressed by pressure exerted during the usage of the electronic device 1000, the window 340 and the camera module 2100 may be spaced apart from each other by a specific distance. Thus, the probability that the window 340 is damaged by the camera module 2100 may be significantly reduced. Accordingly, product reliability of the electronic device may be improved.

Figure 7:
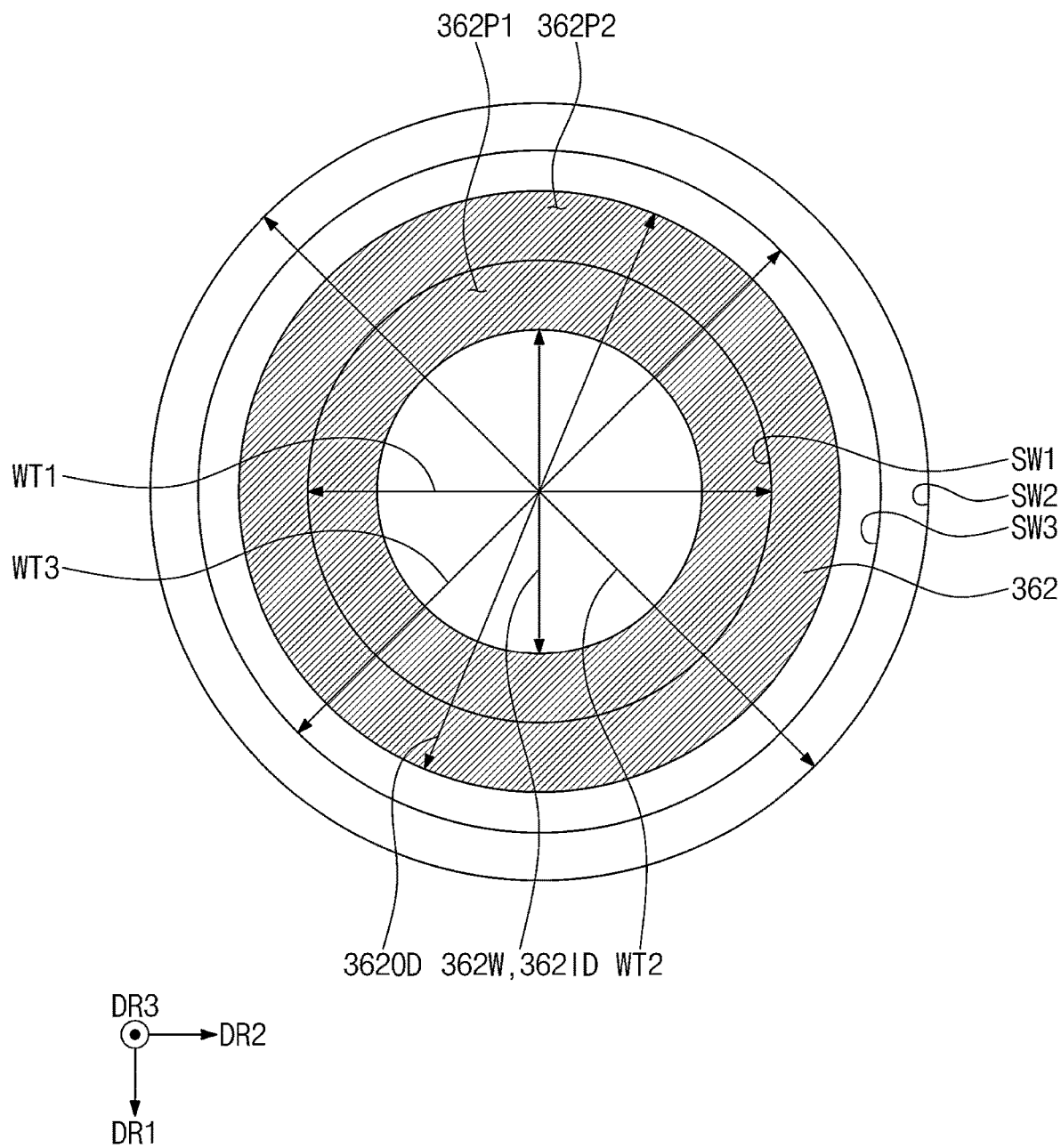
FIG. 7 is a plan view of an exemplary embodiment of the first to third sidewalls and the second light-blocking pattern of FIG. 6.

FIG. 7 is a plan view of an exemplary embodiment of the first to third sidewalls and the second light-blocking pattern of FIG. 6.

The second light-blocking pattern 362, the first sidewall SW1, the second sidewall SW2, and the third sidewall SW3 are exemplarily illustrated in FIG. 7.

When viewed in a plan view, the first sidewall SW1 may overlap the second light-blocking pattern 362, and the second sidewall SW2 and the third sidewall SW3 may not overlap the second light-blocking pattern 362. When viewed in a plan view, the third sidewall SW3 may enclose and/or completely surround the second light-blocking pattern 362, and the second sidewall SW2 may enclose and/or completely surround the third sidewall SW3.

Referring to FIGS. 6 and 7, the first width WT1 of the first hole portion 101H1, the second width WT2 of the second hole portion 101H2, and the third width WT3 of the third hole portion 101H3 may be different from each other. For example, the second width WT2 may be greater than the first width WT1 and the third width WT3, and the third width WT3 may be greater than the first width WT1.

An inner diameter 362ID of the second light-blocking pattern 362 may range from 2 mm to 3 mm (in particular, about 2.68 mm), and an outer diameter 362OD of the second light-blocking pattern 362 may range from 3.2 mm to 4.2 mm (in particular, about 3.72 mm). Thus, the width 362TW (e.g., see FIG. 4B) of the second light-blocking pattern 362 may be about 0.52 mm.

The first hole portion 101H1 may correspond to a hole defined in the display panel 100. When viewed in a plan view, a portion 362P1 of the second light-blocking pattern 362 may be disposed in the first hole portion 101H1. In other words, the portion 362P1 of the second light-blocking pattern 362 may overlap the first hole portion 101H1. In addition, another portion 362P2 of the second light-blocking pattern 362 may not overlap the first hole portion 101H1.

Figure 8:
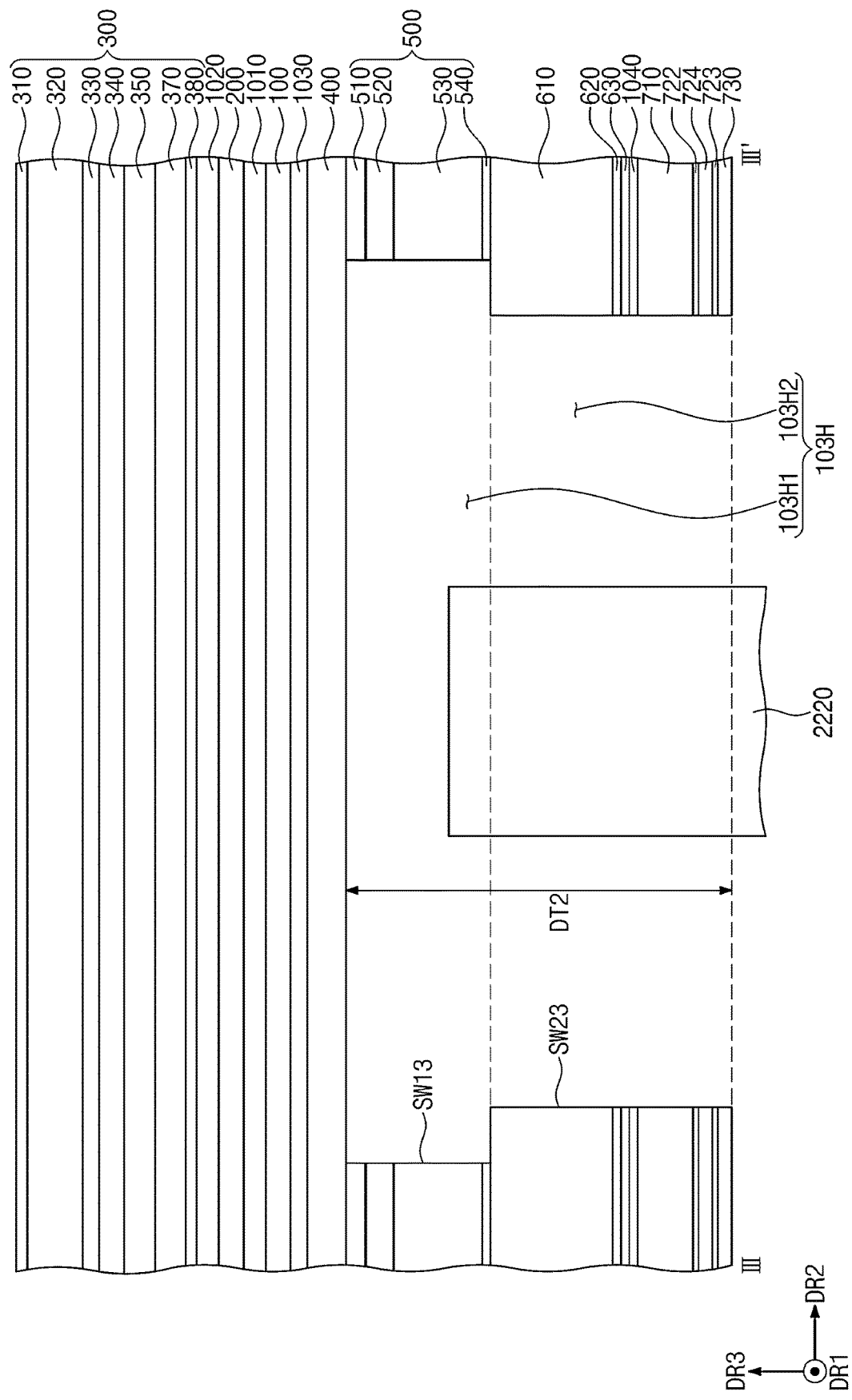
FIG. 8 is a cross-sectional view taken along line III-III' of FIG. 1A to illustrate an exemplary embodiment of the electronic device.

FIG. 8 is a cross-sectional view taken along line III-III' of FIG. 1A to illustrate an exemplary embodiment of the electronic device.

FIG. 8 illustrates the third hole 103H, in which the light-receiving module 2220 is inserted. The second hole 102H (e.g., see FIG. 5), in which the light-emitting module 2210 (e.g., see FIG. 4A) is inserted, may have substantially the same sectional structure as the third hole 103H, and thus, one may understand technical features associated with the second hole 102H (e.g., see FIG. 5) through the following description.

The third hole 103H may include a first hole portion 103H1 and a second hole portion 103H2. The first hole portion 103H1 may be defined by a first sidewall SW13, and the second hole portion 103H2 may be defined by a second sidewall SW23.

The first hole portion 103H1 and the second hole portion 103H2 may have different sizes from each other. For example, the size of the first hole portion 103H1 may be greater than the size of the second hole portion 103H2.

The first hole portion 103H1 may be provided in the cushion member 500, and in an exemplary embodiment, the first hole portion 103H1 may be formed by a shearing process on the cushion member 500. The second hole portion 103H2 may be formed by a shearing process on the first lower member 600 and the second lower member 700.

The third hole 103H may not be provided in the display panel 100. For example, the third hole 103H may be provided in at least one of elements disposed below the display panel 100. Thus, a portion of the display panel 100 overlapped with the third hole 103H may display an image and may sense an input applied from the outside.

The first hole 101H (e.g., see FIG. 6) may penetrate the display panel 100, but the third hole 103H may not penetrate the display panel 100. For example, the depth DT1 of the first hole 101H (e.g., see FIG. 6) may be greater than a depth DT2 of the third hole 103H.

Figure 9:
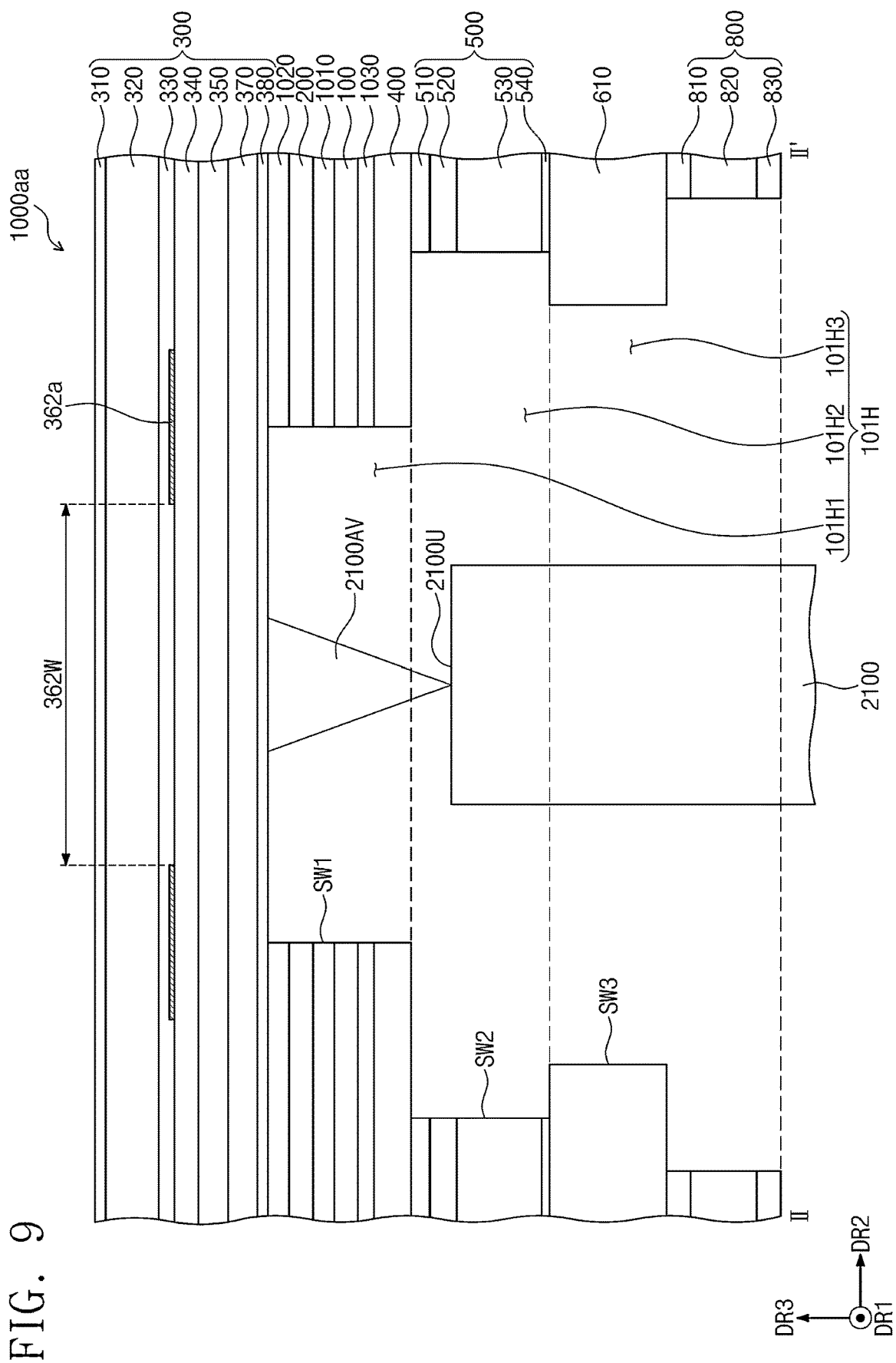
FIG. 9 is a cross-sectional view taken along line II-II' of FIG. 1A to illustrate another exemplary embodiment of the electronic device.

FIG. 9 is a cross-sectional view taken along line II-II' of FIG. 1A to illustrate another exemplary embodiment of the electronic device. In the following description of FIG. 9, an element previously described with reference to FIG. 6 may be identified by the same reference number without repeating the description thereof to avoid redundancy.

Referring to FIG. 9, the second light-blocking pattern 362a of an electronic device 1000aa may be disposed between the window 340 and the first upper adhesive layer 330. The first light-blocking pattern 361 (e.g., see FIG. 4A) of the electronic device 1000aa may also be disposed between the window 340 and the first upper adhesive layer 330.

The second light-blocking pattern 362a may be printed on a top surface of the window 340 and may be covered with the first upper adhesive layer 330. The thickness of the second light-blocking pattern 362a may range from 0.5 µm to 1.5 µm (in particular, 1 µm). However, the thickness of the second light-blocking pattern 362a is not limited thereto.

According to an exemplary embodiment, the second light-blocking pattern 362a is disposed on the top surface of the window 340, and it may be possible to reduce the probability that an uneven portion is formed in layers covering the second light-blocking pattern 362a since the second light-blocking pattern 362a has a relatively thin thickness. For example, the second light-blocking pattern 362a may have a thickness lower than that of another light-blocking pattern, such as the first light-blocking pattern 361 overlapping the peripheral region 1000NA of FIG. 1A. Accordingly, it may be possible to prevent deterioration in the quality of an image obtained by the camera module 2100.

Figure 10:
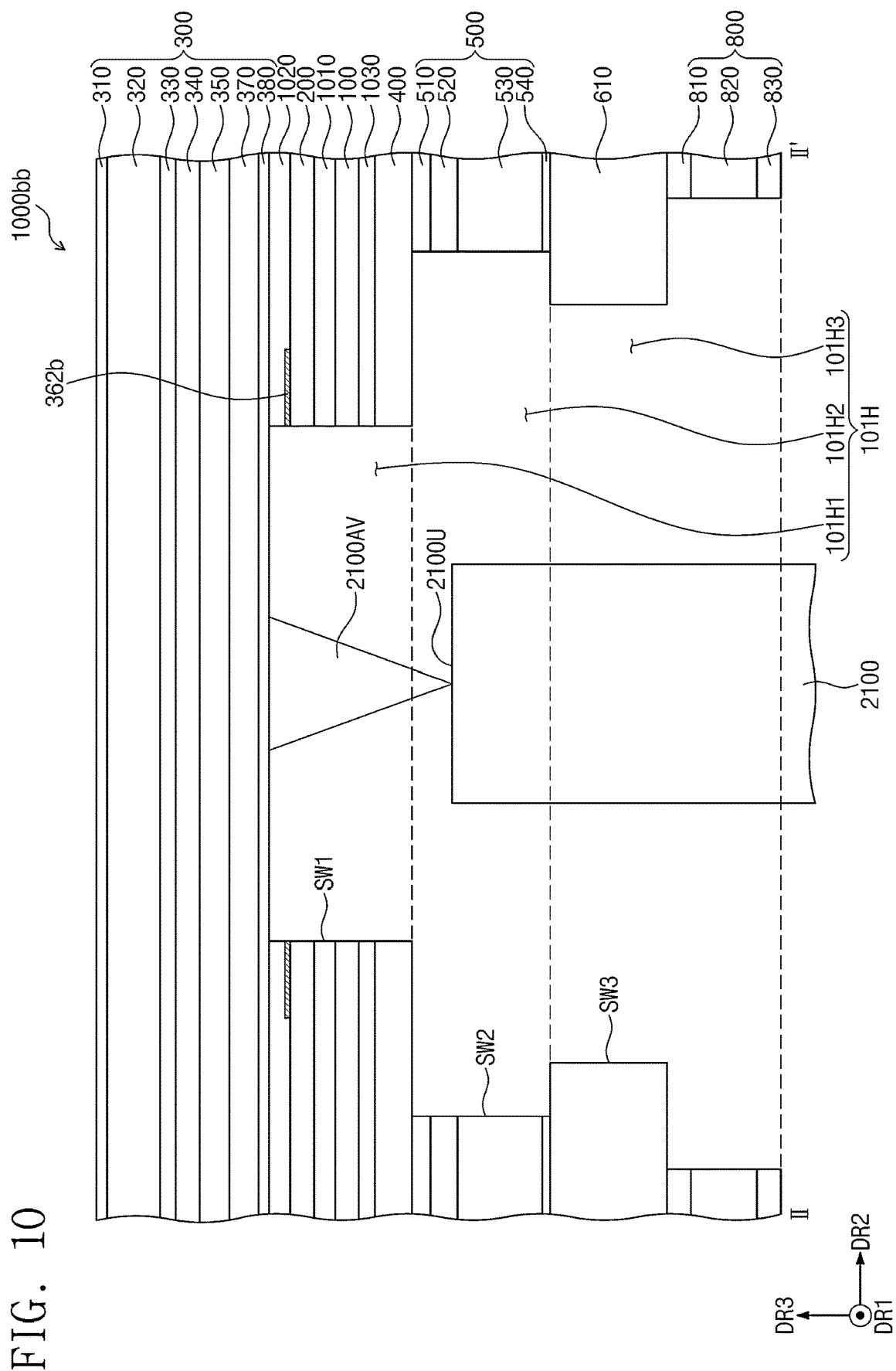
FIG. 10 is a cross-sectional view taken along line II-II' of FIG. 1A to illustrate still another exemplary embodiment of the electronic device.

FIG. 10 is a cross-sectional view taken along line II-II' of FIG. 1A to illustrate still another exemplary embodiment of the electronic device. In the following description of FIG. 10, an element previously described with reference to FIG. 6 may be identified by the same reference number without repeating the description thereof to avoid redundancy.

Referring to FIG. 10, the second light-blocking pattern 362b of an electronic device 1000bb may be disposed between the second adhesive layer 1020 and the anti-reflection member 200. The first light-blocking pattern 361 of the electronic device 1000bb (e.g., see FIG. 4A) may be disposed between the second adhesive layer 1020 and the anti-reflection member 200. The second light-blocking pattern 362b may constitute a portion of the first sidewall SW1 defining the first hole portion 101H1.

The second light-blocking pattern 362b may be printed on the anti-reflection member 200 and may be covered with the second adhesive layer 1020. The thickness of the second light-blocking pattern 362b may range from 0.5 µm to 1.5 µm (in particular, about 1 µm). However, the thickness of the second light-blocking pattern 362b is not limited thereto.

According to an exemplary embodiment, the second light-blocking pattern 362b is disposed on the top surface of the anti-reflection member 200, and it may be possible to reduce the probability that an uneven portion is formed in layers covering the second light-blocking pattern 362b since the second light-blocking pattern 362b has a relatively thin thickness. For example, the second light-blocking pattern 362b may have a thickness lower than that of another light-blocking pattern, such as the first light-blocking pattern 361 overlapping the peripheral region 1000NA of FIG. 1A. Accordingly, it may be possible to prevent deterioration in the quality of an image obtained by the camera module 2100.

Figure 11:
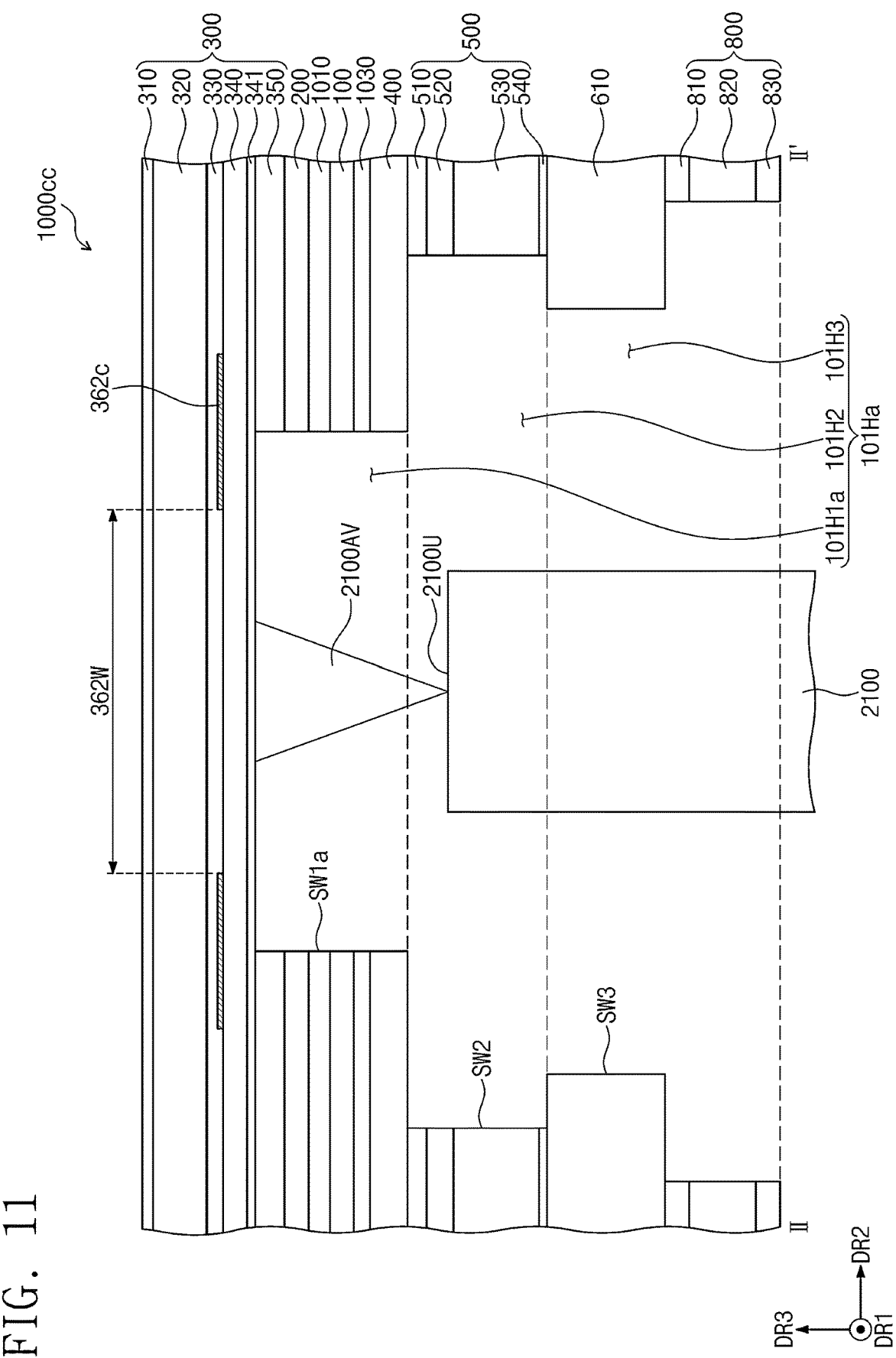
FIG. 11 is a cross-sectional view taken along line II-II' of FIG. 1A to illustrate yet another exemplary embodiment of the electronic device.

FIG. 11 is a cross-sectional view taken along line II-II' of FIG. 1A to illustrate yet another exemplary embodiment of the electronic device. In the following description of FIG. 11, an element previously described with reference to FIG.

6 may be identified by the same reference number without repeating the description thereof to avoid redundancy.

An electronic device 1000cc of FIG. 11 may not include the impact absorbing layer 370, the second hard coating layer 380, and the second adhesive layer 1020 of FIG. 6, when compared with the electronic device 1000 described with reference to FIG. 6. In this case, the upper member 300 may be attached to the anti-reflection member 200 via the second upper adhesive layer 350. In addition, the electronic device 1000cc may further include a second hard coating layer 341 disposed below the window 340, when compared with the electronic device 1000 of FIG. 6.

The first hole 101Ha may include the first hole portion 101H1a, the second hole portion 101H2, and the third hole portion 101H3. The first hole portion 101H1a may be defined by the first sidewall SW1a. The first hole portion 101H1a may be formed by a laser cutting process. The first sidewall SW1a may include sidewalls of the lower protection film 400, the third adhesive layer 1030, the display panel 100, the first adhesive layer 1010, the anti-reflection member 200, and the second upper adhesive layer 350. After the formation of the first hole 101Ha, the second upper adhesive layer 350 may be attached to the second hard coating layer 341.

The second hard coating layer 341 may be exposed by the first hole portion 101H1a. The bottom surface of the window 340 may be planarized by the second hard coating layer 341. Since the second hard coating layer 341 covers the bottom surface of the window 340 to protect the window 340 against other elements of the electronic device 1000cc, such as the camera module 2100, it may be possible to prevent the window 340 from damaged due to the other elements such as the camera module 2100.

The second light-blocking pattern 362c may be disposed between the window 340 and the first upper adhesive layer 330. The first light-blocking pattern 361 of the electronic device 1000cc (e.g., see FIG. 4A) may be disposed between the window 340 and the first upper adhesive layer 330.

The second light-blocking pattern 362c may be printed on the top surface of the window 340 and may be covered with the first upper adhesive layer 330. The thickness of the second light-blocking pattern 362c may range from 0.5 μm to 1.5 μm (in particular, about 1 μm). However, the thickness of the second light-blocking pattern 362c is not limited thereto.

According to an exemplary embodiment, the second light-blocking pattern 362c is disposed on the top surface of the window 340, and it may be possible to reduce the probability that an uneven portion is formed in layers covering the second light-blocking pattern 362c since the second light-blocking pattern 362c has a relatively small thickness. For example, the second light-blocking pattern 362c may have a thickness less than that of another light-blocking pattern, such as the first light-blocking pattern 361 overlapping the peripheral region 1000NA of FIG. 1A. Accordingly, it may be possible to prevent deterioration in the quality of an image obtained by the camera module 2100.

Figure 12:
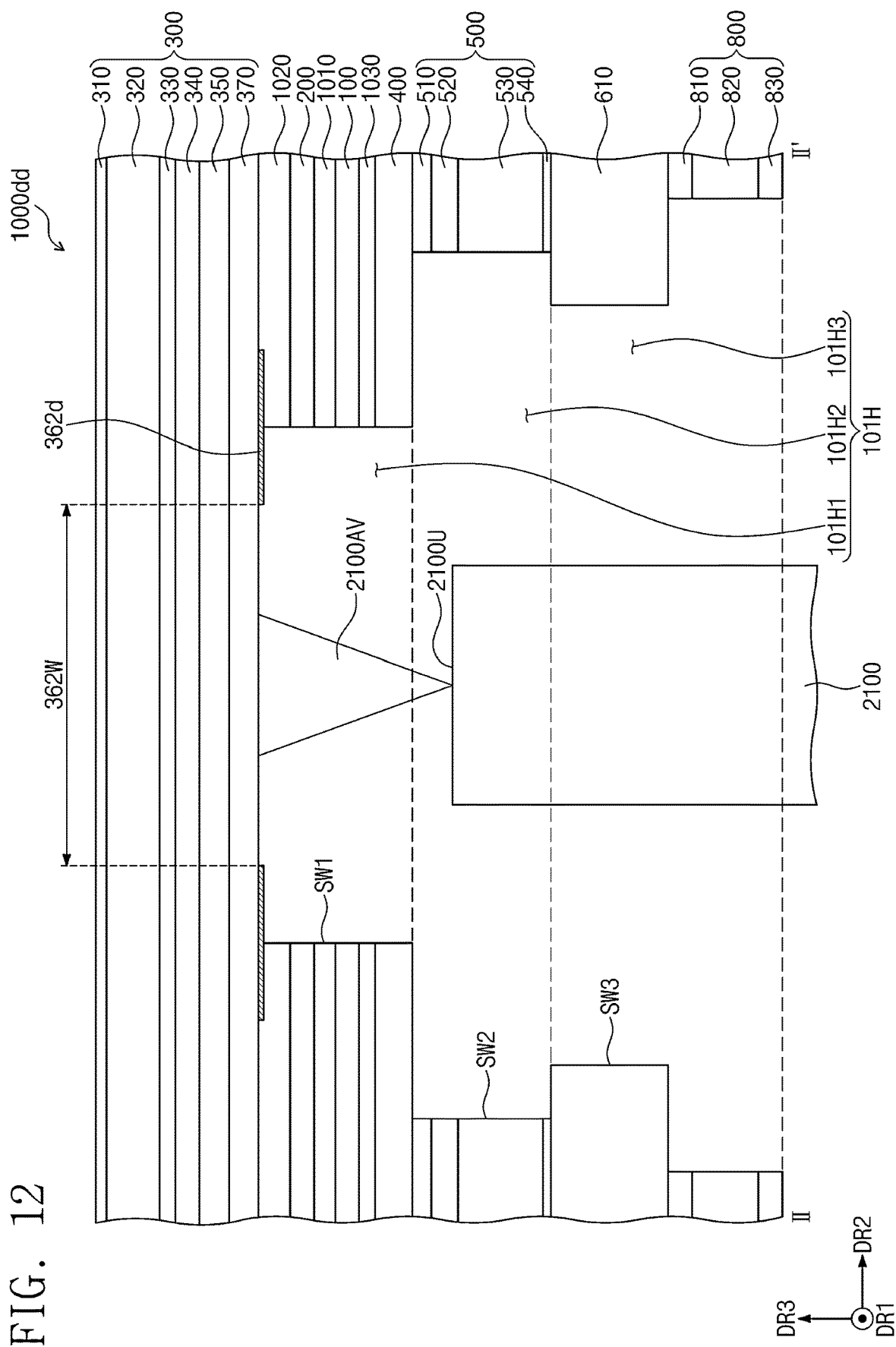
FIG. 12 is a cross-sectional view taken along line II-II' of FIG. 1A to illustrate still yet another exemplary embodiment of the electronic device.

FIG. 12 is a cross-sectional view taken along line II-II' of FIG. 1A to illustrate still yet another exemplary embodiment of the electronic device. In the following description of FIG. 12, an element previously described with reference to FIG. 6 may be identified by the same reference number without repeating the description thereof to avoid redundancy.

Referring to FIG. 12, an electronic device 1000dd may not include the second hard coating layer 380, when compared with the electronic device 1000 described with reference to FIG. 6.

The second light-blocking pattern 362d may be disposed on the top or bottom surface of the impact absorbing layer 370. FIG. 12 illustrates an example, in which the second light-blocking pattern 362d is disposed on the bottom surface of the impact absorbing layer 370. The second light-blocking pattern 362d may be disposed between the impact absorbing layer 370 and the second adhesive layer 1020.

The distance between the camera module 2100 and the second light-blocking pattern 362d may be reduced, compared with the example of FIG. 6. Thus, the second light-blocking pattern 362d may not veil the view angle region 2100AV of the camera module 2100, even when the width 362W of the region, which is enclosed and/or completely surrounded by the second light-blocking pattern 362d, is reduced.

The thickness of the second light-blocking pattern 362d may range from 0.5 μm to 1.5 μm (in particular, about 1 μm). However, the thickness of the second light-blocking pattern 362d is not limited thereto. According to an exemplary embodiment, it may be possible to reduce the probability that an uneven portion is formed in layers covering the second light-blocking pattern 362d since the second light-blocking pattern 362d has a relatively thin thickness. Accordingly, it may be possible to prevent deterioration in the quality of an image obtained by the camera module 2100.

Figure 13:
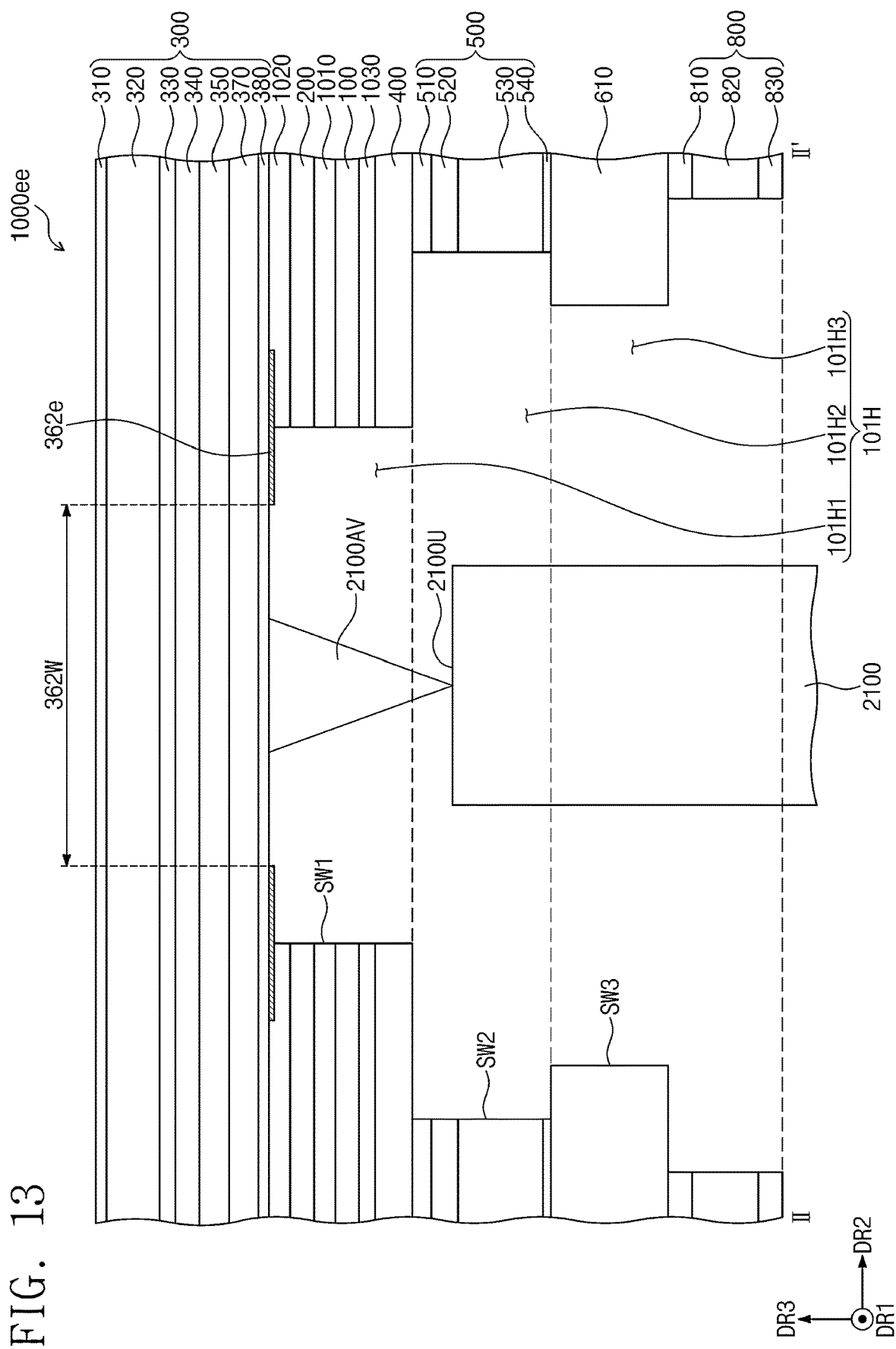
FIG. 13 is a cross-sectional view taken along line II-II' of FIG. 1A to illustrate another exemplary embodiment of the electronic device.

FIG. 13 is a cross-sectional view taken along line II-II' of FIG. 1A to illustrate another exemplary embodiment of the electronic device. In the following description of FIG. 13, an element previously described with reference to FIG. 6 may be identified by the same reference number without repeating the description thereof to avoid redundancy.

Referring to FIG. 13, an electronic device 1000ee may differ from the electronic device 1000 described with reference to FIG. 6 in terms of the position of the second light-blocking pattern 362e.

The second light-blocking pattern 362e may be disposed below the second hard coating layer 380. The second light-blocking pattern 362e may be disposed between the second adhesive layer 1020 and the second hard coating layer 380. The first light-blocking pattern 361 (e.g., see FIG. 4A) of the electronic device 1000ee may be disposed between the second adhesive layer 1020 and the second hard coating layer 380.

The distance between the camera module 2100 and the second light-blocking pattern 362e may be reduced, compared with the example of FIG. 6. Thus, the second light-blocking pattern 362e may not veil the view angle region 2100AV of the camera module 2100, even when the width 362W of the region, which is enclosed and/or completely surrounded by the second light-blocking pattern 362e, is reduced.

In addition, the thickness of the second light-blocking pattern 362e may range from 0.5 μm to 1.5 μm (in particular, 1 μm). However, the thickness of the second light-blocking pattern 362e is not limited thereto. According to an exemplary embodiment, it may be possible to reduce the probability that an uneven portion is formed in layers covering the second light-blocking pattern 362e since the second light-blocking pattern 362e has a relatively small thickness. For example, the second light-blocking pattern 362e may have a thickness less than that of another light-blocking pattern, such as the first light-blocking pattern 361 overlapping the peripheral region 1000NA of FIG. 1A. Accordingly, it may be possible to prevent deterioration in the image quality of an image obtained by the camera module 2100.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device, comprising:
   a display panel in which a hole is defined;
   a plurality of layers disposed on the display panel and including a first layer and a second layer attached to a first surface of the first layer; and
   a light-blocking pattern disposed between the first layer and the second layer,
   wherein the first surface of the first layer comprises an uneven surface.

2. The electronic device of claim 1, wherein the first layer and the light-blocking pattern are disposed between the display panel and the second layer.

3. The electronic device of claim 1, wherein the plurality of layers further includes a window,
   the window is spaced apart from the display panel with the first layer, the second layer, and the light-blocking pattern interposed therebetween, and
   the first layer is an impact absorbing layer.

4. The electronic device of claim 3, wherein the second layer is attached to the window and the first surface of the first layer.

5. The electronic device of claim 1, wherein the plurality of layers further includes a hard coating layer disposed on a second surface of the first layer opposing the first surface of the first layer.

6. The electronic device of claim 1, wherein the plurality of layers further includes a protective layer,
   the protective layer is spaced apart from the display panel with the first layer, the second layer, and the light-blocking pattern interposed therebetween, and
   the first layer is a window.

7. The electronic device of claim 6, wherein the second layer is attached to the protective layer and the first surface of the first layer.

8. The electronic device of claim 6, wherein the first layer includes a glass substrate or a synthetic resin film.

9. The electronic device of claim 1, further comprising a peripheral light-blocking pattern surrounding at least a portion of the light-blocking pattern, when viewed in a plan view,
   wherein a thickness of the light-blocking pattern is less than or equal to a thickness of the peripheral light-blocking pattern.

10. The electronic device of claim 9, wherein the thickness of the peripheral light-blocking pattern is greater than or equal to three times the thickness of the light-blocking pattern.

11. The electronic device of claim 1, wherein a thickness of the light-blocking pattern ranges from 0.5 μm to 1.5 μm.

12. The electronic device of claim 1, wherein at least a portion of the light-blocking pattern overlaps the hole.

13. The electronic device of claim 1, wherein the light-blocking pattern is completely covered by the second layer, and
   wherein the second layer overlaps the hole, when viewed in a plan view.

14. The electronic device of claim 1, wherein at least a portion of the light-blocking pattern is exposed without being covered by the second layer.

15. The electronic device of claim 1, wherein the second layer is disposed between the display panel and the first layer.

16. The electronic device of claim 1, wherein an inner surface of the light-blocking pattern is aligned with a side surface of the display panel defining the hole.

17. The electronic device of claim 1, wherein the light-blocking pattern comprises a first portion being covered by the second layer and a second portion without being covered by the second layer, and
   wherein the second portion overlaps the hole, when viewed in a plan view.

* * * * *